US008146000B1

(12) United States Patent
Boliek et al.

(10) Patent No.: US 8,146,000 B1
(45) Date of Patent: Mar. 27, 2012

(54) INTEGRATED TRANSACTIONAL WORKFLOWS DISTRIBUTED ACROSS MULTIPLE CONTACT CENTERS

(75) Inventors: David Boliek, Carnation, WA (US); Bart Dellinger, Bothell, WA (US); Romain Machacek, Redmond, WA (US); John Cofano, Redmond, WA (US)

(73) Assignee: Goodwell Technologies, Inc., Redmond, WA (US)

( * ) Notice: Subject to any disclaimer, the term of this patent is extended or adjusted under 35 U.S.C. 154(b) by 36 days.

(21) Appl. No.: 11/246,906

(22) Filed: Oct. 7, 2005

(51) Int. Cl.
*G06F 3/00* (2006.01)
*G06Q 10/00* (2006.01)

(52) U.S. Cl. ........ 715/748; 715/753; 715/965; 705/348; 705/7.27

(58) Field of Classification Search .................. 715/505, 715/748, 753, 965; 705/348, 7.27
See application file for complete search history.

(56) References Cited

U.S. PATENT DOCUMENTS

| 7,330,873 | B2 * | 2/2008 | Yoshida et al. | 709/203 |
| 7,343,406 | B1 * | 3/2008 | Buonanno et al. | 709/224 |
| 2004/0111302 | A1 * | 6/2004 | Falk et al. | 705/4 |
| 2005/0010454 | A1 * | 1/2005 | Falk et al. | 705/4 |

FOREIGN PATENT DOCUMENTS

WO    WO 2004/044696 A2 *  5/2004

* cited by examiner

*Primary Examiner* — Namitha Pillai
(74) *Attorney, Agent, or Firm* — Brundidge & Stanger, P.C.

(57) ABSTRACT

The integration of transactional workflows that are distributed across multiple contact centers is described herein. Respective agent interfaces can execute concurrently with applications running at two or more contact centers. These interfaces enable agents at the contact centers to conduct respective interactions with a customer. As the interactions progresses, the agents can enter data related to the interactions via the agent interfaces. The agent interfaces need not be integrated with the applications or the contact center infrastructure, thereby eliminating the expense of performing such integration. Instead, the agents can use both the application and the agent interfaces concurrently while interacting with the customer. Data entered by one agent via the interface can be made available to the other agent, thereby enabling the agents to cooperate with one another, and integrating the respective interactions into a cohesive transactional workflow.

39 Claims, 32 Drawing Sheets

Reports

Choose a report: Enrollment Summary — 1605
— 1620 run report

Choose enrollment center: trendwest — 1705
Choose date range: From: 4/24/2003 To: 5/1/2003
Choose format: ● HTML Table ○ Tab Delimited
1610 —— 1615 ——

Enrollment Summary Report - trendwest - 4/24/2003 To 5/1/2003

| Enrollment Center | # Total Enrolled | # New Enrollments | # Cancelled / Ended Enrollments |
|---|---|---|---|
| trendwest | 1 | 2 | 1 |

Enrollment Center - trendwest - 4/24/2003 To 5/1/2003

| Enrollment Agent Summary | Number | Percent |
|---|---|---|
| Sales Attempts | 10 | n/a |
| New Enrollments | 2 | 20 |
| Manual Renewal | 0 | 0 |
| Declined (not now) | 1 | 10 |
| Declined (never) | 2 | 20 |
| More Info | 4 | 40 |
| No Sale Attempted | 1 | 10 |
| Cancel (w/refund) | 0 | n/a |
| Cancel (no refund) | 0 | n/a |

1625

Enrollment Center - trendwest - 4/24/2003 To 5/1/2003

| Misc | Number |
|---|---|
| Online New Enrollments | 0 |
| Auto Renewal - Successful | 0 |
| Auto Renewal - Failed | 0 |
| Enrollment Ended (no auto renew) | 1 |

Reports

Choose a report: Demographic Sales Report — 1605
Choose enrollment center: trendwest — 1705
Choose date range: From: 4/01/2003 To: 5/5/2003
Choose format: ⦿ HTML Table  ○ Tab Delimited
         1610        1615

— 1620 run report

Demographic Sales Report - trendwest - 4/01/2003 To 5/5/2003

| State / Province | # Enrolled | # Declined | # Declined(never) | # More Info |
|---|---|---|---|---|
| [unknown] | 0 | 1 | 2 | 0 |
| CO | 1 | 0 | 0 | 0 |
| TX | 0 | 0 | 0 | 1 |
| WA | 1 | 0 | 0 | 3 |

INTEGRATED TRANSACTIONAL WORKFLOWS DISTRIBUTED ACROSS MULTIPLE CONTACT CENTERS

BACKGROUND

As various industries continue the trend toward consolidation, corporate enterprises can commonly include various different business units, each of which may operate in different business sectors. Depending on the nature of a given enterprise and the various industries in which the business units operate, the business units may or may not operate in related industries. Nevertheless, there may be circumstances where it would be desirable to transition a given customer from one business unit to another in an integrated workflow.

In another growing trend, enterprises are increasingly outsourcing certain business functions to third parties, who in turn may perform these business functions for a number of different clients. Because these third parties may perform these or similar business functions for a variety of clients, these third parties may achieve efficiencies in performing these functions. These efficiencies may enable these third parties to offer these services to clients for less than the clients would spend to perform these services in-house. Examples of such outsourced services are call center functions.

Business enterprises typically include back-office computer systems that perform the bulk of the transactional processing germane to that business enterprise. Illustrative examples of such back-office systems can include web servers that push content to client browsers to support e-commerce transactions with customers, database servers that respond to queries, and on-line transaction processors (OLTPs) that handle transactions.

In a typical scenario wherein services are outsourced from one entity to another, or wherein a workflow is transitioned across two or more different entities, part of the scenario may include tightly integrating the back-office support systems that comprise the different entities. The process of tightly integrating these support systems can present a considerable challenge for several reasons. First, the two systems may be quite dissimilar from one another, and not designed to communicate with each other. Second, security issues may preclude tightly integrating the two systems. Accordingly, it may be appropriate to implement firewalls or the like to prevent one system from gaining unauthorized access to the other system. Third, any differences in corporate culture between the two entities are typically magnified when attempting to integrate the systems comprising these two entities, and can hinder the success of the entire integrating project. Fourth, if the two systems need to share high volumes of data to accomplish the integrated workflow, a high-bandwidth communications channel is established between the two systems. Such communications channels are typically expensive.

Other obstacles are omitted from the foregoing discussion for brevity and conciseness. Overcoming these challenges and obstacles to integrate the back-office systems of the two entities typically entails considerable time and expense. Expending this time and expense can make the entire outsourcing or workflow integration scenario less attractive to the two or more involved entities.

SUMMARY

The integration of transactional workflows that are distributed across multiple contact centers is described herein. Respective agent interfaces can execute concurrently with applications running at two or more contact centers. These interfaces enable agents at the contact centers to conduct respective interactions with a customer. As the interactions progresses, the agents can enter data related to the interactions via the agent interfaces. The agent interfaces need not be integrated with the applications or the contact center infrastructure, thereby eliminating the expense of performing such integration. Instead, the agents can use both the application and the agent interfaces concurrently while interacting with the customer. Data entered by one agent via the interface can be made available to the other agent, thereby enabling the agents to cooperate with one another, and integrating the respective interactions into a cohesive transactional workflow.

BRIEF DESCRIPTION OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

FIG. 5 is a diagram illustrating a user interface that can be presented to enable the agents to search for records pertaining to a given customer.

FIG. 9 is a diagram illustrating a user interface presented to the agents in response to clicking an "attempt enrollment" button, as shown in FIG. 5.

FIG. 10 is a diagram illustrating a user interface presented to the agents in response to clicking a "decline or sale not attempted" field, as shown in FIG. 9.

FIG. 11 is a diagram illustrating a user interface presented to the agents in response to clicking a "more information requested" field, as shown in FIG. 9.

FIG. 12 is a diagram illustrating a user interface presented to the agents in response to clicking an "enroll" field, as shown in FIG. 9.

FIG. 19 is a diagram illustrating a user interface that presents an "Enrollment Summary" report to a manager.

FIG. 21 is a diagram illustrating a user interface that presents an "Enrollment Agent Summary (detailed)" report to a manager.

FIG. 23 is a diagram illustrating a user interface that presents a "More Info Request List" report to a manager.

FIG. 24 is a diagram illustrating a user interface that presents an "Enrollment Status Change List" report to a manager.

FIG. 25 is a diagram illustrating a user interface that presents a "Demographic Sales Report" report to a manager.

DETAILED DESCRIPTION

Figure 1:
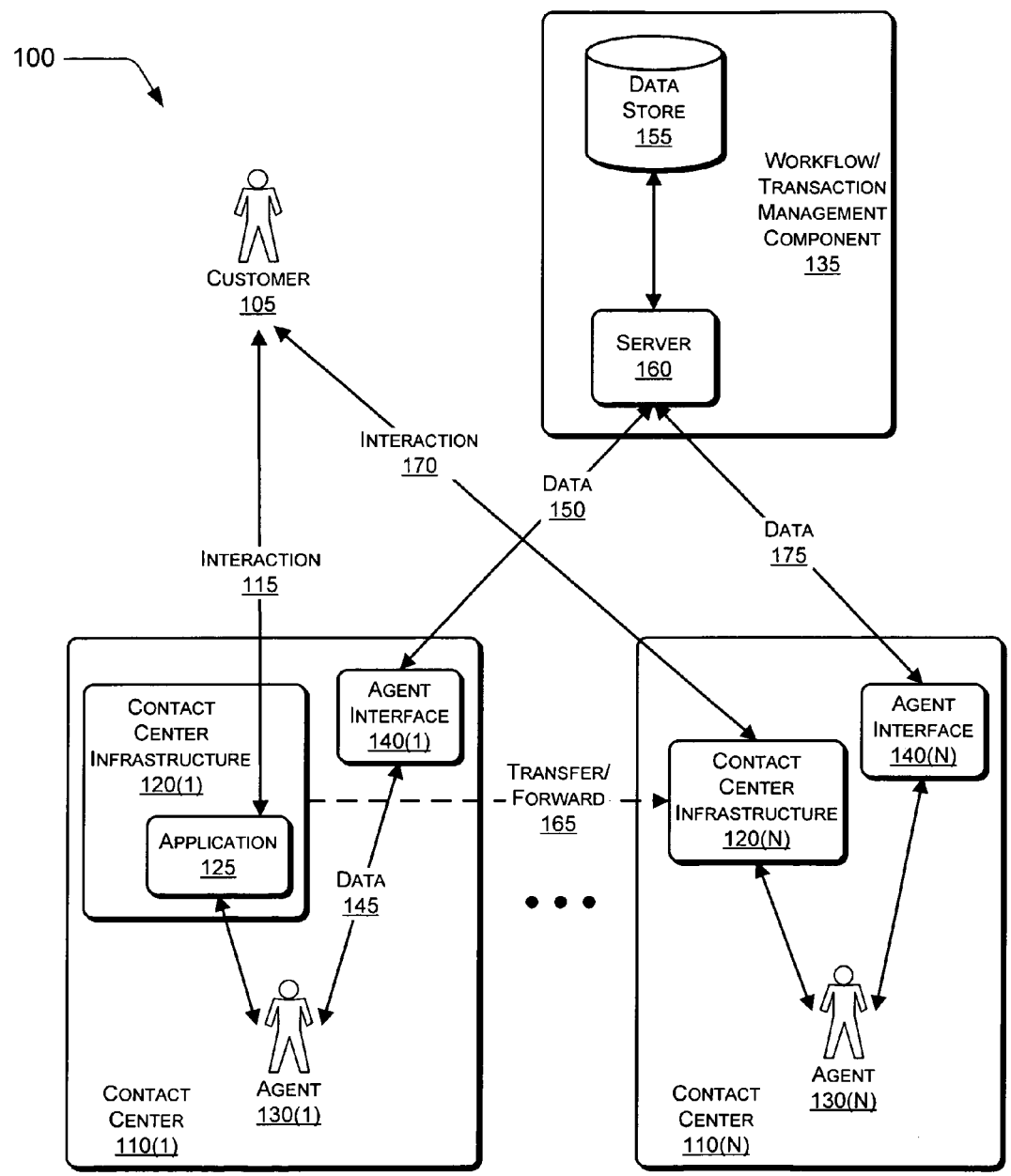
FIG. 1 is a block diagram illustrating components and data flows associated with an architecture for supporting an integrated workflow between two or more contact center entities.

FIG. 1 illustrates an architecture 100 for supporting an integrated transactional workflow between two or more contact centers. Assume, for example, that a customer 105 contacts a first contact center 110, with the interaction therebetween being represented generally by the line 115. It is understood that the interaction 115 could be either an inbound contact, with the customer 105 initiating communication with the contact center 110, or the interaction 115 could be an outbound contact, with the representatives of the contact center 110 initiating communication with the customer 105. Further, the interaction 115 can be facilitated using circuit-switched technologies such as telephone-based audio, or using packet-switched technologies such as Internet-based audio or video. The interaction 115 can also be facilitated using instant messaging (IM) or short message service (SMS) technologies. The interaction 115 can also involve content that is interactively shared between the customer 105 and the agent 130, for example, via web browser sharing techniques.

In any event, the customer 105 and the first contact center 110 are placed in communication via a suitable telecommunications network and related network infrastructure, which is omitted from FIG. 1 for clarity and conciseness. The contact center 110 may include at least contact center infrastructure 120, which is included to represent the components and related processes included in a typical contact center 110. For example, the contact center infrastructure 120 may include automatic call distributor (ACD) systems, switches, routers, computing systems running software to support the foregoing, or the like. The infrastructure 120 may include a data center associated with the contact center 110.

An application 125 executes in the context of the contact center infrastructure 120, and can operate to guide the interaction 115 between the customer 105 and an agent 130. For example, the interaction 115 may involve executing some transaction sought by the customer 105 and/or offered by the contact center 110. Assuming that the contact center 110 enables customers 105 to make reservations for lodging or other accommodations, the application 125 may indicate to the agent 130 which information to obtain from the customer 105, how to prompt the customer 105 for information related to the reservation, and the like. The application 125 may also facilitate data entry by the agent 130 as the interaction 115 with the customer 105 progresses, for example, by providing fields or records into which the agent 130 may enter transaction-related data. The bidirectional nature of the interaction 115 between the customer 105 and the agent 130 is represented by the double-headed arrow representing the interaction 115 as shown in FIG. 1.

In connection with the ongoing interaction 115 between the customer 105 and the agent 130, it may be desirable to arrange or facilitate a subsequent interaction between the customer 105 and one or more additional agents 130. The additional agents 130 may be situated in one or more additional contact centers 110. For convenience of illustration but not limitation, FIG. 1 illustrates two contact centers 110, referenced collectively as contact centers 110 and referenced individually as contact centers 110(1) and 110(N), with N being chosen as any integer greater than one. Similarly, FIG. 1 illustrates two agents 130, collectively as agents 130 and referenced individually as agents 130(1) and 130(N), with N likewise being chosen as any integer greater than one.

The contact centers 110(1) and 110(N) are shown with corresponding instances of the contact center infrastructure 120, collectively as contact center infrastructures 120 and referenced individually as contact center infrastructures 120(1) and 120 (N), with N being chosen as any integer greater than one. It is understood that the respective instances of the contact center infrastructure 120 may or may not be equipped and configured identically.

To facilitate one or more subsequent interactions between the customer 105 and one or more additional agents 130(N), a workflow management component 135 may be operatively associated with, for example, the contact centers 110(1) and 110(N). While the customer 105 is interacting with the agent 130(1) at the first contact center 110(1), the workflow management component 135 and the agent 130(1) can communicate via an agent interface 140(1).

For example, the agent 130(1) and the customer 105 can interact to reserve a hotel or other lodging for the customer 105 using the application 125. During this interaction 115, the agent 130(1) can also enter selected data via the agent interface 140(1). This data is represented generally by the line 145. In turn, this data 145 is communicated to the workflow management component 135. Data flows between the workflow management component 135 and the agent interface 140(1) are represented generally by the line 150, which indicates a bi-directional data flow. The data 150 can include prompts provided by the workflow management component 135 to the agent 130(1) that indicate which data should be obtained from the customer 105 and entered into the agent interface 140(1). More generally, the data 150 received from the workflow management component 135 can enable the agent 130 to guide the interaction 115 with the customer 105.

It is understood that the data 145 can be entered manually by the agent 130(1) in some implementations of the teachings herein. In other implementations, the data 145 can be automatically populated, for example, by using "screen scraping" techniques. In the latter implementations, the data 145 can be pulled automatically from the data resulting from the interaction 115 between the agent 130(1) and the customer 105 using the application 125.

The workflow management component 135 includes a data store 155 that is operative to store data 150 that pertains to respective interactions 115 between customers 105 and agents 130. Data 150 can be received, for example, via the web browser 140. The workflow management component 135 can also include one or more servers 160 that push data to the web browsers 140 and receive data therefrom. The servers 160 and the data store 155 can be coupled to communicate with one another. The servers 160 can take the form of, for example, a web server or other suitable technology as appropriate to communicate with the agent interface 140(1).

To further illustrate the functioning of the workflow management component 135, recall the previous example wherein the customer 105 contacts the contact center 110(1) to make a reservation for lodging in connection with an upcoming trip. Assume further that the second contact center 110(N) has associated therewith one or more agents 130(N) who are trained, licensed, and/or certified to offer insurance coverage to the customer 105 as protection during the upcoming trip. Before, during, or after the interaction 115 between the customer 105 and the agent 130(1), it may become apparent that the customer 105 may benefit from the services (e.g., insurance) offered by the agent 130(N). At an appropriate time, for example, after concluding the interaction 115, the customer 105 may be forwarded or transferred to a second contact center 110(N), as represented generally by the line 165. In effect, the customer 105 is placed in communication with the contact center infrastructure 120(N) at the second contact center 110(N).

In different embodiments of the subject matter described herein, the customer 105 may be simultaneously in contact with both the agents 130(1) and 130(N) for some period of time, or may be in contact with only one of the agents 130(1) or 130(N) at any given time. In any event, the customer 105 is eventually placed in communication so as to interact with the agent 130(N), as represented generally by the line 170.

Recall that the first agent 130(1) entered data 145 previously via the agent interface 140(1), and that corresponding data 150 was stored in the data store 155. To facilitate the further interaction 170 between the customer 105 and the second agent 130(N), data from the data store 155 can be forwarded to a second agent interface 140(N) accessible to the agent 130(N). This data forwarded from the data structure 150 is represented generally by the line 175 shown in FIG. 1. In general, the data 175 enables or allows the agent 130(N) to perform the second interaction 170 with the customer 105, based at least in part on the previous interaction 115. In this manner, the customer 105 need not "start over" entirely with the second agent 130(N).

To further illustrate the foregoing, recall the example introduced above, in which the customer 105 interacts, first, with the agent 130(1) to make lodging reservations, and then interacts with the agent 130(N) to be offered an insurance policy relating to the trip. Returning to this example, the data 175 pulled from the data store 155 may enable the agent 130(N) to access the results of the first interaction 115 between the customer 105 and the agent 130(1). In this manner, the agent 130(N) can, in some sense, pick up where the agent 130(1) left off, or otherwise benefit from the work already done by the agent 130(1). Therefore, the customer 105 need not repeat information already provided to the agent 130(1) during the first interaction 115, thereby reducing telecommunications toll charges and customer frustration. Given this pre-existing data 175 relating to the customer 105 and the first interaction 115, the agent 130(N) can efficiently offer, for example, the insurance coverage in the second interaction 170.

Several observations are now noted regarding the architecture 100 shown in FIG. 1. The architecture 100 can support an integrated workflow that includes the two interactions 115 and 170 between the customer 105 and the first and second agents 130(1) and 130(N), using the workflow management component 135. The term "integrated" is used herein to convey that data resulting from the first interaction 115 between the customer 105 and the agent 130(1) is stored and transferred, at least in part, to the second agent 130(N) for use in the second interaction 170. Accordingly, at least from the perspective of the customer 105, the agents 130(1) and 130(N) appear to be cooperating with one another, rather than engaging the customer 105 in two discrete and unrelated transactions. From the viewpoint of the customer, the transfer-forward 165 from the first agent 130(1) to the second agent 130(N) could well be transparent.

It is further noted that the infrastructures 120 of the contact centers 110 need not be integrated to perform the processing discussed above. More particularly, the contact center infrastructures 120, or the back-end or back-office computer systems that may be included as part thereof, need not necessarily communicate with one another. Note that while FIG. 1 includes a line 165 representing the transfer of the customer 105 from the contact center 110(1) to the contact center 110(N), this does not mean that these two contact centers 110 must communicate with one another. Instead, this transfer function may be performed by the telecommunications network (not shown) at a level above either of the contact centers 110.

Because the contact centers 110 need not communicate with one another and need not have their systems integrated, the time and expense involved with integrating the contact centers 110 so as to communicate with one another is avoided by the architecture 100. Instead of integrating the contact centers 110, the architecture 100 provides the workflow management component 135, which serves as an intermediary between the contact centers 110, and enables the agents 130 to communicate effectively via the data store 155, the server 160, and the web browsers 140. The agents 130 need only be trained to enter or access data with the agent interfaces 140, and need not be trained on entire new applications 125. Because the architecture 100 calls for little or no integration between the back-end infrastructures 120 of the contact centers 110, the architecture 100 may be viewed as providing a "no touch" or "low touch" solution for enabling an integrated workflow between the contact centers 110. Also, aside from transferring data to and from the agent interfaces 140, the workflow management component 135 need not be integrated with the infrastructures 120 of the contact centers 110.

It is recognized that the contact centers 110 can represent different entities within a given single corporate enterprise, such as a large conglomerate, or can represent separate business entities who are not affiliated with one another. In the former example, large corporate enterprises may be affected by the "silo" phenomenon, where different segments of the enterprise may not effectively communicate or cooperate with one another, almost as if they were separate companies altogether. The silo phenomenon arises for different reasons, such as the cost/benefit of integrating the different silos, the differences in the corporate cultures or mindsets prevailing within different silos, or the like. However, the subject matter taught herein may overcome this silo phenomenon while avoiding investment of time and cost in terms of formally integrating the different segments of the enterprise. For example, viewing the contact centers 110 shown in FIG. 1 as respective segments of the enterprise, the workflow management component 135 can enable these two segments to share transaction workflows with relatively little integration expense.

It is also noted that, in some implementations, the bandwidth demands associated with the data flows 150 and 175 may be less, relative to the bandwidth demands of a solution integrating the infrastructures 120 of the contact centers 110. Such an integrated solution might involve transferring portions of the data centers of the respective contact centers 110 between one another. The bandwidth demands of such transfers could be considerable and expensive to satisfy, as compared to the data flows 150 and 175 associated with the architecture 100.

The architecture 100 may be advantageous where the agents 130 possess specialized skill with respect to particular products or services, or where the agents 130 should be located within certain geographic areas for licensing or regulatory purposes. For example, a state or province may require that all persons selling insurance to residents of that state or province be licensed by that state or province. In such a scenario, particular agents 130 who are licensed in states or provinces of interest may be brought aboard with little overhead expense.

As shown in FIG. 1, the agents 130 can communicate with the contact centers 110. In some instances, the agents 130 may be physically present in the contact centers 110. However, it is understood that the agents 130 need not be physically present in the contact centers 110 in all implementations of the teachings herein. Accordingly, the agents 130 can include home-based agents who work from their homes to interact with customers 105. The agents 130 can also include other agents who otherwise interact with customers 105 remotely from the contact center 110. Finally, the agents 130 can be reception desk clients on-site at particular businesses other than the contact centers 110. In light of the foregoing, it is understood that the relationship between the agents 130 and the contact centers 110 as shown in FIG. 1 is chosen only for convenience of illustration and discussion. FIG. 1 and all of the other Figures included herein are therefore illustrative and non-limiting.

As another example, the architecture 100 may be readily adapted to the healthcare or health insurance context. Assume that the customer 105 is a patient needing some type of medical condition. Conventionally, the customer would locate and then travel physically to a primary care physician. However, the architecture 100 can enable the customer 105 to reach an agent 130, who might be, for example, a nurse practitioner or other professional who is licensed and qualified to perform initial screening on the customer 105. The agent 130 can perform this screening in a question-and-answer interaction 115 using the agent interface 140(1) as driven by the workflow management component 135. Data 150 resulting from this interaction 115 can be stored in the data store 155. A subsequent agent 130(N) might be, for example, a general-practice physician, who can then access the data 150 and conduct a second interaction 170 with the customer 105. The subsequent agent 130(N) can store a diagnosis, drug prescription, or other medical notes as data 175 for storage in the data store 155.

Other potential agents 130 who might participate in this illustrative workflow might include an insurance representative who can direct the customer 105 to an in-network nurse practitioner or general-practice physician, and/or gather data 150 for filing a claim on behalf of the customer 105. Another illustrative agent 130 can be a pharmacist who fills a prescription for the customer 105.

It is understood that the foregoing examples are provided to illustrate, rather than limit, the subject matter described and claimed herein. It is further emphasized that the two contact centers 110 shown in FIG. 1 are illustrative in nature and not limiting. In general, different implementations of the teachings herein can include N contact centers 110 or other such entities.

The agent interfaces 140 can take any form suitable or appropriate for communicating with the server 160. For example, if the server 160 is implemented as a web server, the agent interfaces 140 can take the form of web browsers. Other implementations of the agent interfaces 140 can include fat clients, thin clients, or the like. The agent interfaces 140 and server 160 may also be implemented using, for example, the COMPACT FRAMEWORK™ smart device development framework, available from Microsoft Corporation of Redmond, Wash.

Figure 2:
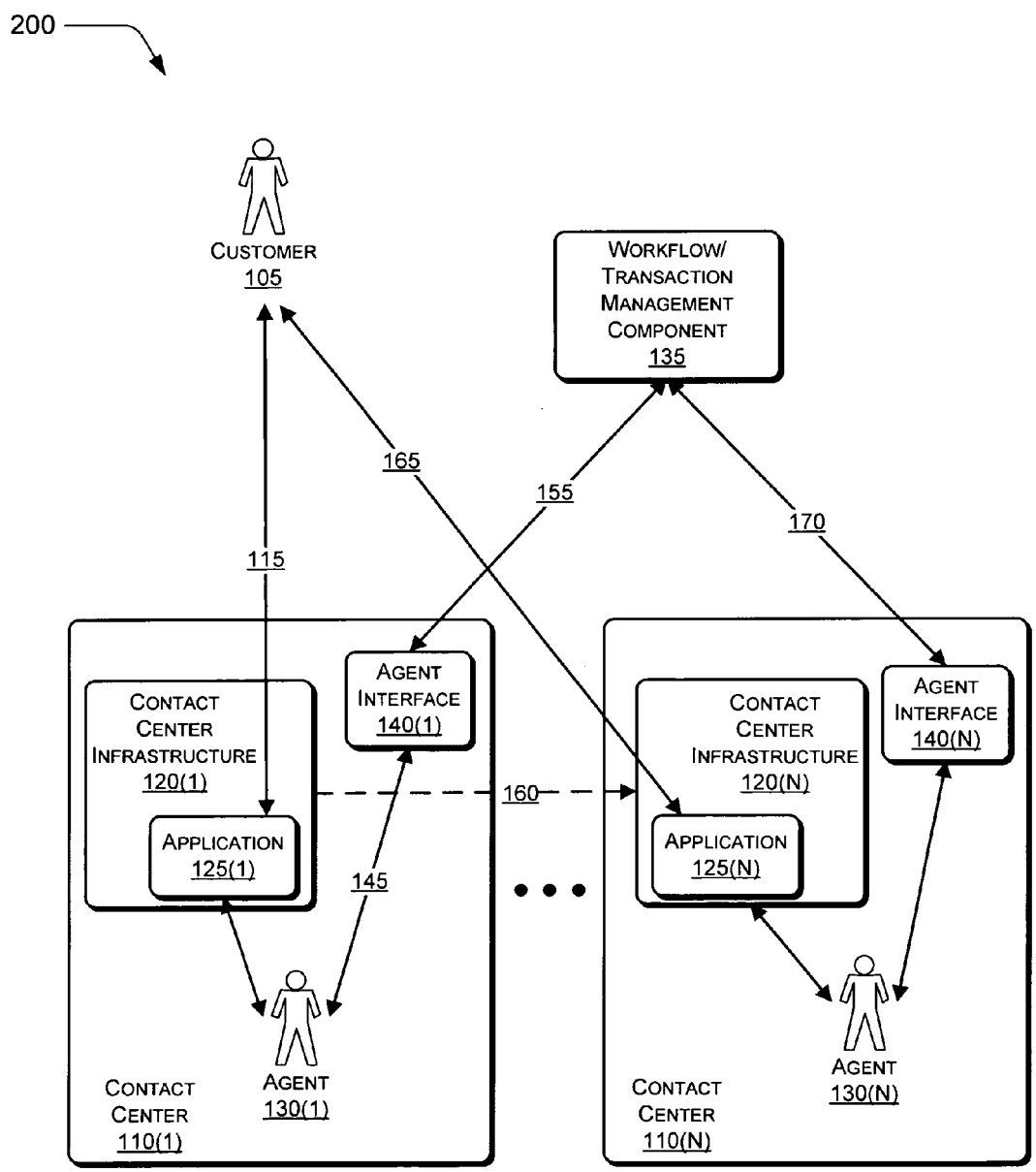
FIG. 2 is a block diagram illustrating components and data flows associated with another architecture for supporting an integrated workflow between two or more contact center entities.

FIG. 2 is a block diagram illustrating components and data flows associated with an architecture 200 for supporting an integrated workflow between two or more contact center entities. The architecture 200 is similar to the architecture 100 shown and discussed above in connection with FIG. 1. However, the architecture 200 includes respective instances of the application 125, with the application 125(1) residing within the contact center 110(1) and the application 125(N) residing within the contact center 110(N). The application 125(1) and the application 125(N) are referred to collectively as the application 125 for convenience.

As shown in FIG. 1, the agent 130(N) may be able to complete the interaction 170 with the customer 105 using only the agent interface 140(N) and the data 175 previously entered by the agent 130(1). Returning to the reservation-insurance example above, the agent 130(N) may be able to offer and take an order for the insurance in the contact center 110(N) using only on the data 175 accessed through the agent interface 140(N). However, in other implementations, the application 125(N) may be provided, for example, to provide functionality appropriate to enable the agent 130(N) to offer and conclude the interaction 170 with the customer 105.

Figure 3:
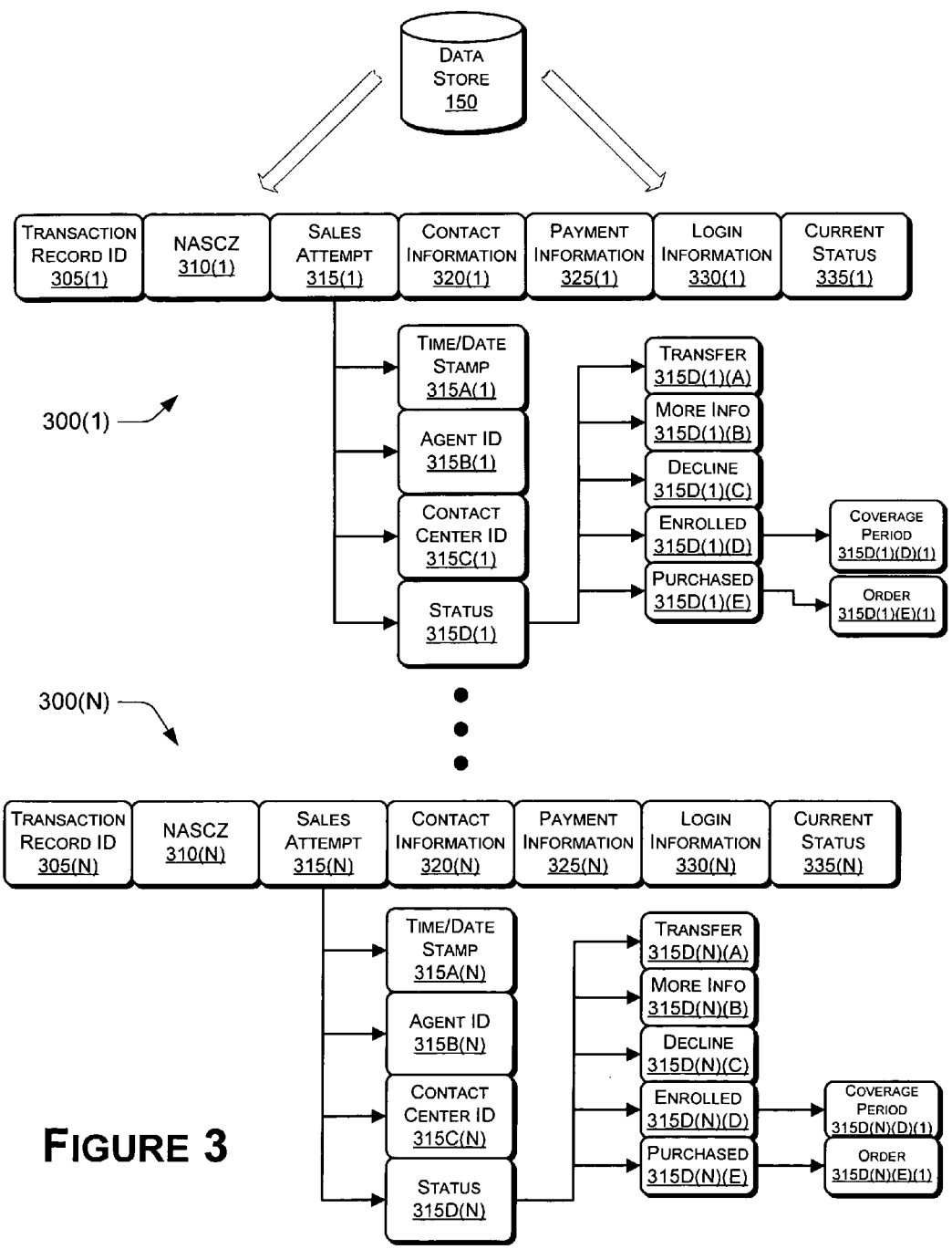
FIG. 3 is a block diagram illustrating example fields for a data store supporting the architectures shown in FIGS. 1 and 2.

FIG. 3 illustrates example fields for the data store 150 shown in FIGS. 1 and 2. For convenience but not limitation, FIG. 3 includes two sample records, referenced individually as records 300(1) and 300(N) and referenced collectively as records 300. It is understood that the data store 150 can include N instances of the records 300, with N being any integer greater than 1. In one illustrative implementation, one respective record 300 can be associated with each transaction conducted by a given contact center agent 130. In another illustrative implementation, one respective record 300 could be associated with each particular customer 105. In addition, other alternatives are possible that combine parts of the foregoing two approaches.

FIG. 3 illustrates several example fields associated with the records 300, at least some of which can be included in various implementations of the teachings herein. A field 305 can contain a unique identifier or key suitable to identify a particular record 300. For example, the field 305 can contain a sequence of numeric or alphanumeric characters that form a type of serial number or account number identifying the given record 300. A field 310 can contain Name, Address, City, State, and ZIP Code (NACSZ) information for a particular customer 105.

A field 315 can contain information relating to a particular sales attempt. For example, during a sales attempt, a given customer 105 may be offered the opportunity to enroll in a program or to purchase goods or services. It is understood that the field 315 can contain data for one sales attempt, or may contain respective data for a plurality of different sales attempts. It is further understood that the field 315 can also contain information relating to an interaction involving the customer 105 that does not result in a consummated order or transaction.

In any event, the field 315 can contain sub-fields that identify further data associated with one or more given sales attempts. For example, a sub-field 315A can contain a time and/or date stamp indicating when a given sales attempt occurred. A sub-field 315B can indicate which agent 130 was involved with a particular sales attempt. A sub-field 315C can indicate which contact center 110 handled one or more aspects of a particular sales attempt.

A sub-field 315D can contain a status or result of the sales attempt. For example, a field 315D(1)(A) may indicate that the sales attempt resulted in a transfer to another contact center 110 and/or another agent 130. A field 315D(1)(B) may indicate that the sales attempt resulted in the customer 105 requesting more information about the subject matter of the sales attempt. A field 315D(1)(C) may indicate that the customer 105 declined the sales attempt. A field 315D(1)(D) may indicate that the customer 105 accepted the sales attempt and enrolled in an program offered during the sales attempt. In this event, a field 315D(1)(D)(1) may provide details relating to the enrollment of the customer 105, such as a coverage period applicable to the customer 105. A field 315D(1)(E) may indicate that the customer 105 accepted the sales attempt and purchased a product or service offered during the sales attempt. In this event, a field 315D(1)(E)(1) may provide details relating to the order placed by the customer 105, such as products ordered, colors, sizes, quantity, and the like.

It is understood that the records 300(1) and 300(N) can each contain respective instances of the field 315 and sub-fields 315A, 315B, 315C, 315D, and 315E, as shown in FIG. 3.

A field 320 can contain contact information for a particular customer 105, whether in the form of a mailing address, one or more telephone numbers, e-mail addresses, IP addresses, or any other information enabling contact with the customer 105.

A field 325 can contain payment information indicating how a given customer 105 has paid or is paying for purchases, for example, purchases indicated in field 315. The field 325 can also contain data indicating whether a payment is a recurring payment, wherein some amount is paid repeatedly at some given interval (e.g., monthly, annually, or the like). The field 325 can also contain data indicating whether a payment or purchase is to be renewed automatically, or is to expire after some set period of time.

A field 330 can contain information indicating login information for a given customer 105. With this login information, the customer 105 could, for example, access a website to view, create, modify, or delete data related to his or her account. The login information can include, for example, a username and password.

A field 335 can contain information indicating a current status of the account corresponding to the given record 300. The status indicators can show that a given customer 105 is a prospect who has not yet been offered any products or enrollment for services. The status indicators can show whether or not the customer 105 is to be offered any products or services. Where the customer 105 has been offered products or services, the status indicators can also show when the offer occurred, and can also indicate the prospect's response to that offer. For example, the prospect might have indicated that he/she has no interest in the offer now, but might have interest in the future. The prospect might have indicated that he/she has no interest in the offer either now or in the future. The prospect might have requested additional information to enable more thorough consideration of the offer. Finally, the prospect might have accepted the offer, and purchased the product or enrolled in the services. Any of the foregoing alternatives, or other alternatives, may be indicated in the field 335.

Each of the fields 305-335 are shown with corresponding instances included in the records 300(1) and 300(N). For example, the field 305 is shown with an instance 305(1) in record 300(1) and with an instance 305(N) in record 300(N). Each of the fields 305-335 can be referred to collectively as, for example, field 305, or individually as, for example, field 305(1) or 305(N).

It is understood that the layout, format, contents, order, and arrangement of the various fields 305-335 as shown in FIG. 3 is illustrative in nature, rather than limiting. It is further understood that FIG. 3 is shown only to facilitate this description, and that the data store 150 could contain records 300 that include one, some, or all of the fields 305-335 shown in FIG. 3. Finally, it is noted that the data store 150 can include records 300 that include other fields in addition to the illustrative fields 305-335 as shown in FIG. 3 without departing from the scope and spirit of the subject matter described herein.

Figure 4:
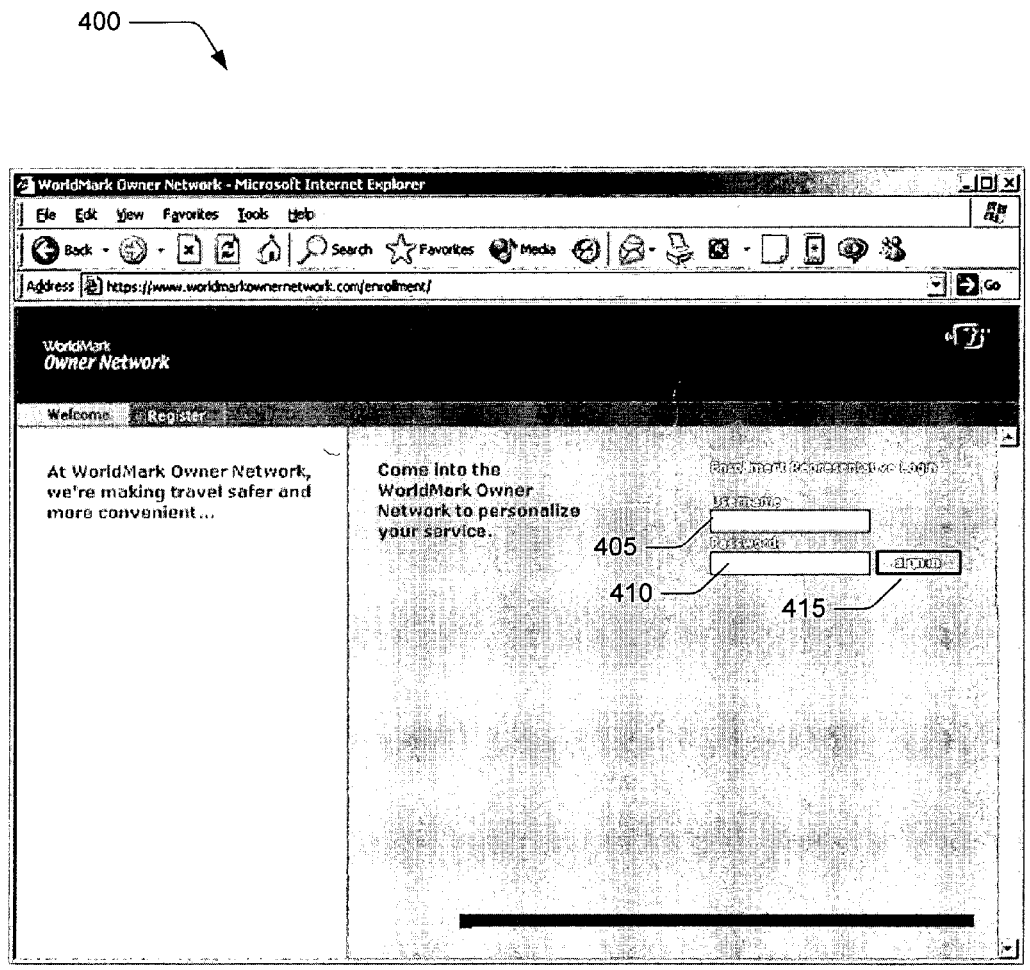
FIG. 4 is a diagram illustrating a user interface that may be presented to agents when they log-in to a contact center infrastructure to make themselves available to interact with customers.

FIG. 4 illustrates a user interface 400 that may be presented to, for example, the contact center agents 130 when they log-in to the contact center infrastructure 120 to make themselves available to interact with customers 105. As shown in FIG. 4, the contact center agent 130 can enter a username into the field 405, enter a password into a field 410, and then click the "sign in" button 415. Assuming that the username and password provided by the contact center agent 130 are valid, the contact center agent 130 is logged in and is made available to customers 105.

The user interface 400, and other user interfaces as described herein, may be presented in windows associated with the agent interfaces 140. Recall that the agent interfaces 140 provide means for enabling the contact center agents 130 to provide data to, and to receive data from, the workflow management component 135. For example, the agent interfaces 140 may be implemented as web browsers, fat clients, or other suitable technologies.

Figure 5:
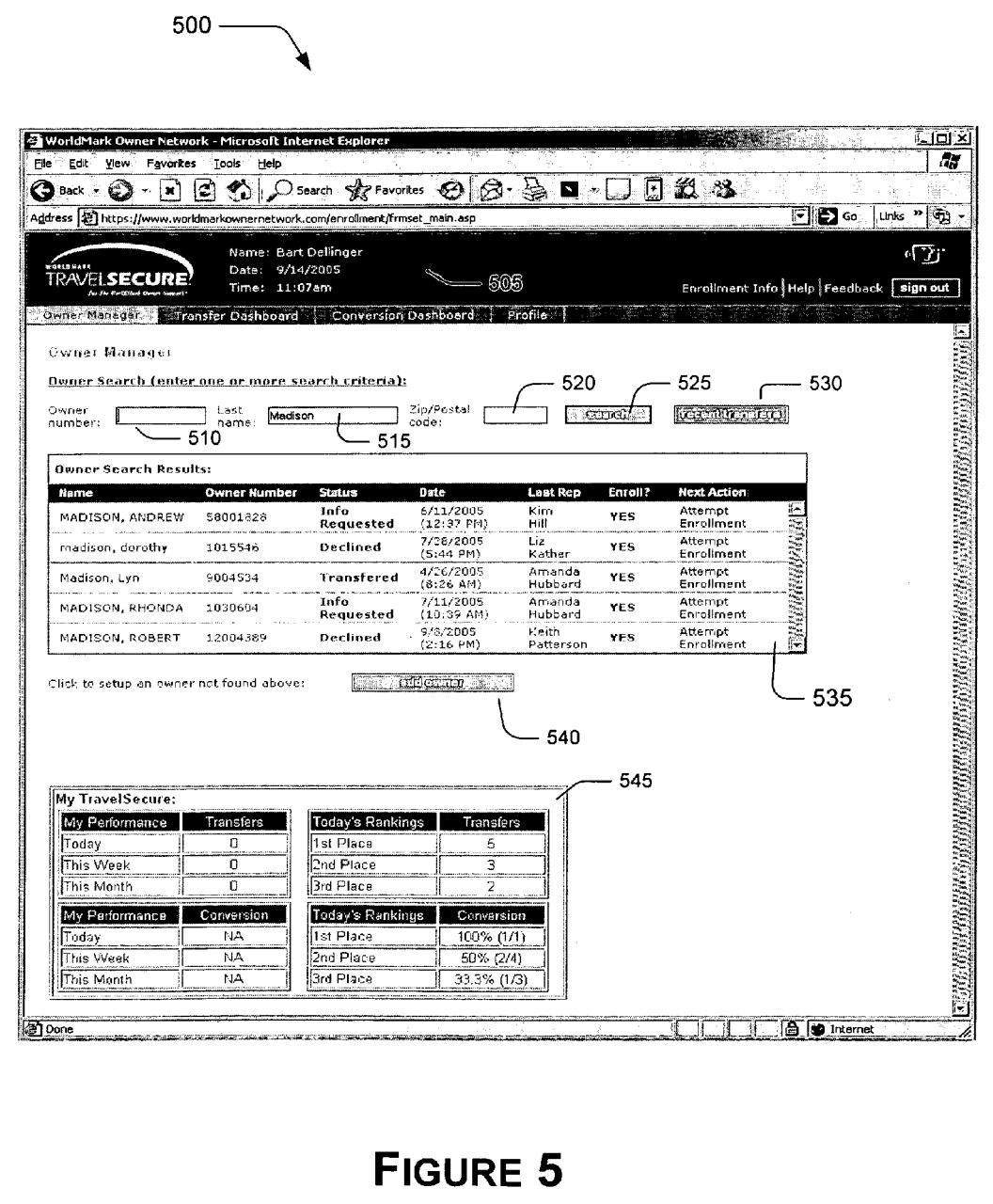

FIG. 5 illustrates a user interface 500 that can be presented to enable the contact center agent 130 to search for records 300 pertaining to a given customer 105. The reference sign 505 generally designates an area in the user interface 500 in which the name of the contact center agent 130, the current date and time, and any other desired information may be indicated. It is understood that the area 505 may be located anywhere appropriate in the user interface 500, not only where shown in FIG. 5.

As the contact center agent 130 interacts with a given customer 105 using the application 125, it may become appropriate for the contact center agent 130 to determine whether any records exist in the data store 150 for that customer 105. Accordingly, data about the customer 105 that is gathered during the course of the interaction may be entered into the user interface 500 to facilitate a search of the data store 150. This data can be manually entered by the contact center agent 130 using the agent interface 140, or can be automatically populated using "screen scraping" techniques. In any event, if an account number, owner number, or other unique alphanumeric identifier corresponding to the customer 105 is known, that identifier can be entered into field 510. The last name of the customer 105 can be entered into field 515. Finally, the zip code of the customer 105 can be entered into field 520. Once at least one of the fields 510, 515, or 520 are filled, the contact center agent 130 can click "Search" button 525 to forward the search terms to the data store 150. A "Recent Transfers" button 530 can be included to enable the agent 130 to see a list of customers 105 who have been transferred to and/or from the given agent 130 and/or contact center 110.

The data store 150 can respond with any search results matching the input search criteria as entered into fields 510, 515, or 520, and the user interface 500 can present these results in area 535. In the example shown in FIG. 5, the string "Madison" was entered in field 515, resulting in the contents shown in area 535. The contents of area 535 indicate that at least five existing customers 105 have records 300 that are responsive to at least some part of the search string "Madison" that was entered in field 515. FIG. 5 also illustrates supplemental data that can be displayed for each record 300 pulled from the data store 150 and presented in area 535. For example, for each customer 105 with the last name "Madison", the area 535 can list a corresponding Owner Number, Status, Date, Last Rep (e.g., agent 130 who assisted the customer 105), whether the customer 105 should be offered enrollment, and the next action to be taken relative to the customer 105. Each one of the contents shown in area 535 can be implemented as hyper-text, or otherwise made responsive to input from the contact center agent 130, such that the contact center agent 130 can navigate to further data pertaining to a selected one of the contents.

If the contents of area 530 are empty for a given search, or if no entry in the area 535 matches a given customer 105, the contact center agent 130 can click button 540 to attempt to enroll the current customer 105. If the customer 105 accepts enrollment, a new record 300 is created for that customer 105 and stored in the data store 150. If that customer 105 subsequently interacts with other contact center agents 130, those agents 130 can retrieve the record 300 using the above techniques.

The user interface 500 can also include an area 545 that presents statistics relating to the performance of the contact center agent 130 who is logged in and using the user interface 500. The area 545 can also present other statistics, such as ongoing rankings reflecting the current achievements of top-performing agents 130 at a given time.

Figure 6:
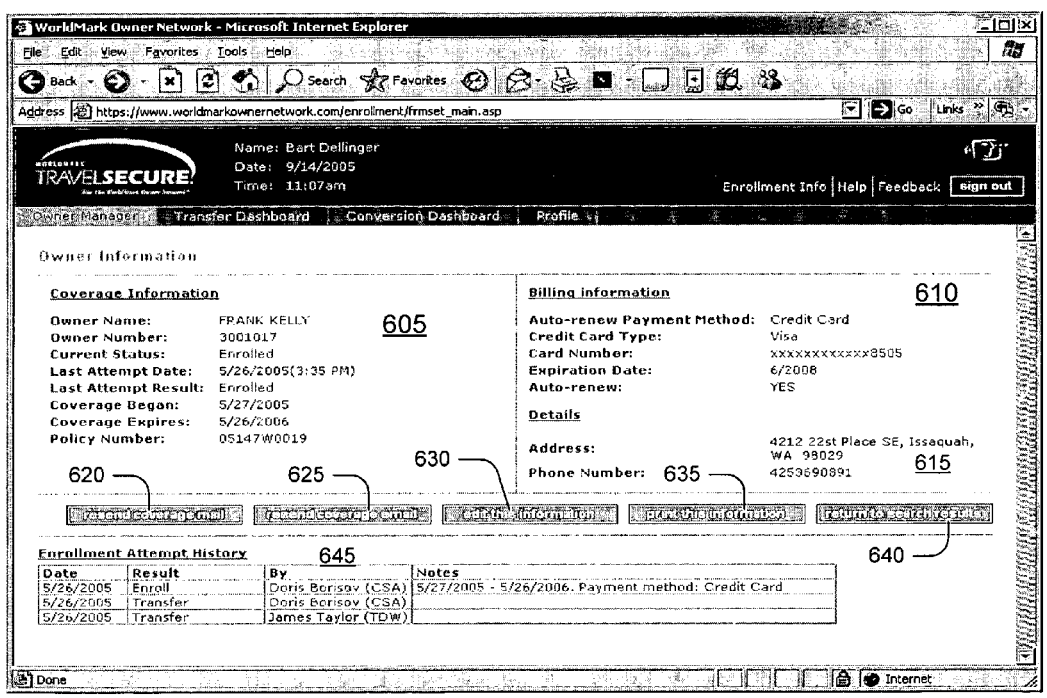
FIG. 6 is a diagram illustrating a user interface that can be presented in response to the agent clicking or otherwise activating one of the result fields, as shown in FIG. 5.

FIG. 6 illustrates a user interface 600 that can be presented in response to the contact center agent 130 clicking or otherwise activating an entry within the area 535 as shown in FIG. 5. The entry clicked in FIG. 5 is assumed to correspond to a customer 105 named "Frank Kelly". The various data shown in the user interface 600 can be populated based on data stored in the record 300 that corresponds to the given customer 105. More particularly, the fields 305-335 shown in FIG. 3 may contain the data appropriate for populating the display shown in the user interface 600 of FIG. 6. For example, area 605 in the user interface 600 indicates "Coverage Information" for the given customer 105. This coverage information can be pulled, at least in part, from fields 315 and/or 335 shown in FIG. 3. Area 610 indicates "Billing Information", and can be pulled, at least in part, from field 325. Area 615 indicates "Details", and can be pulled, at least in part, from fields 310 and 320.

The user interface 600 enables the contact center agent 130 to review the contents of the record 300 pertaining to the selected customer 105. In addition, the user interface 600 can provide buttons 620, 625, 630, and 635. Button 620 enables the contact center agent 130 to send or re-send mail or other equivalent communication to the customer 105 summarizing coverage or other details pertaining to the account in which the customer 105 is enrolled. This mail or other communication can be transmitted based on the contact information presented within area 615.

Button 625 enables the contact center agent 130 to send or re-send a coverage e-mail or other equivalent communication to the customer 105. This e-mail or other communication can be transmitted based on the contact information presented within area 615.

Button 630 enables the contact center agent 130 to edit the data contained in the record 300 for the customer 105. Button 635 enables the contact center agent 130 to print the contents of the record 300 as shown in the user interface 600. Button 640 enables the contact center agent 130 to terminate display of the record 300 and return to a previous state to conduct another search. For example, clicking button 635 can return the contact center agent 130 to the user interface 500 shown in FIG. 5.

Area 645 provides an enrollment attempt history relating to the given customer 105. As shown, the date, result, and agent 130 involved with various previous attempted can be listed. Also, the agent 130 can enter notes pertaining to a given attempt for the benefit of later attempts, which may be made by the same agent 130 or by other agents 130.

The illustrative user interface 600 shown in FIG. 6 pertains to an existing or enrolled customer 105. However, other embodiments of the user interface 600 may be adapted as appropriate to display information for a non-enrolled customer 105. For example, buttons 620, 625, and/or 630 may be altered to read "Attempt Enrollment", to direct the agent 130 to offer enrollment to the customer 105.

Figure 7:
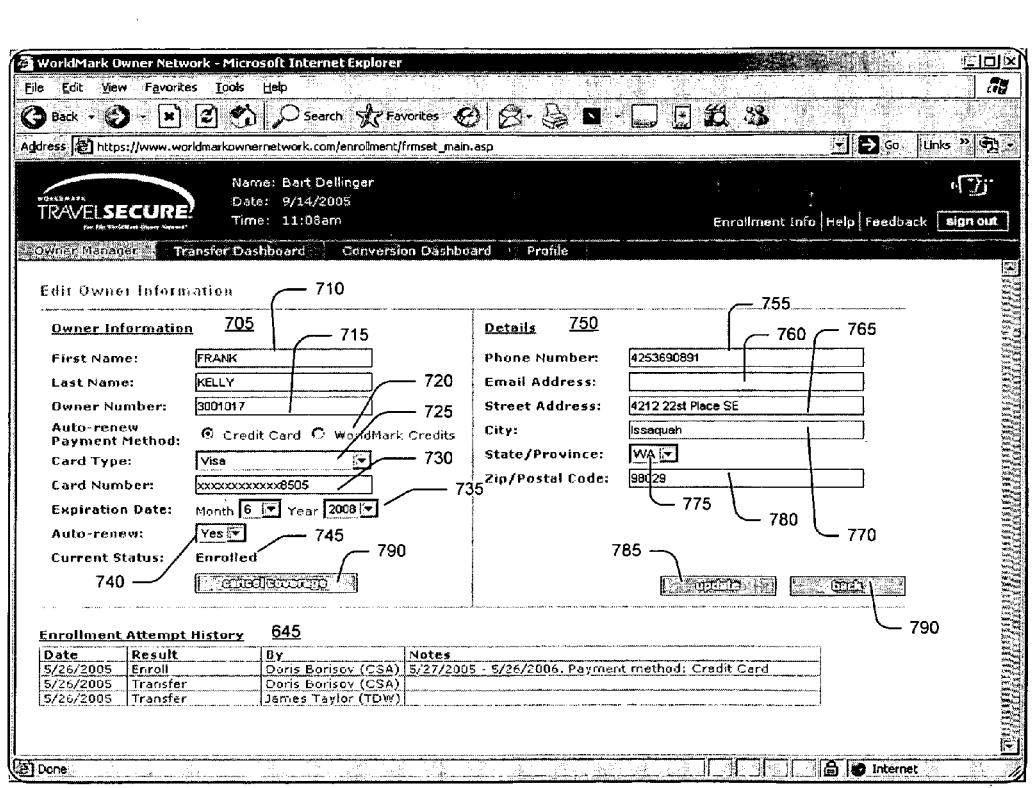
FIG. 7 is a diagram illustrating a user interface presented to the agents in response to clicking an "edit" button, as shown in FIG. 6.

FIG. 7 illustrates a user interface 700 presented to the contact center agent 130 in response to clicking the button 630 shown in FIG. 6. The user interface 700 can include an area 705 for "Owner Information". Within this area 705, fields 710 can store the first and last names of the customer 105. Field 715 can store an owner number, account number, or other unique indicia identifying the customer 105. Field 720 can indicate whether the given account is configured to automatically renew by credit card, or by redemption of credits, reward points, or other equivalent type of loyalty program earned by the customer 105. Field 725 can indicate what type of payment instrument is used by the customer 105 to pay for goods or enroll in services. Assuming that the customer 105 is using a credit card, the field 725 can enumerate a plurality of different credit card types through, for example, a pop-up list. Field 730 can contain the account number of the payment instrument shown in field 725. Fields 735 can contain the expiration date of the payment instrument, as may be expressed in terms of "month" and "year".

Field 740 can indicate whether the account for the customer 105 is configured to automatically renew at the expiration of some term. The field 740 can be arranged as a binary or flag field, with "yes" or "no" options being accessible by a pop-up list. Field 745 indicates the current status of the account for the customer 105, as may be pulled from the field 335 shown in FIG. 3.

The user interface 700 can also include an area 750 for "Details". Within this area 750, field 755 can store a telephone number for the customer 105. Field 760 can store an e-mail address or other equivalent contact information for the customer 105. Field 765 can store a street address, while fields 770 and 775 can store city and state information, respectively. The field 775 can be configured to present a pop-up list of various states and/or provinces. Field 780 can store a ZIP code or other equivalent information for the customer 105.

It is noted that the fields 710-740 and 755-780 are editable by the contact center agent 130 through user interface 700. In contrast, the various fields shown within areas 605, 610, and 615 in FIG. 6 are read-only, and not editable via the user interface 600. If any edits are made to the fields 710-740 and 755-780, the contact center agent 130 can click the button 785 to store the changes and update the record 300 for the customer 105.

By clicking button 790, the contact center agent 130 can return to the user interface 600. If the contact center agent 130 clicks the button 790 before clicking the update button 780, any changes made to fields 710-740 and 755-780 may be lost. This may provide a convenient means for reverting to a previous version of the record 300 for the customer 105, if the contact center agent 130 makes an error in updating the record 300.

Button 795 enables the contact center agent 130 to request that coverage or enrollment for the customer 105 be dropped, as discussed in more detail in connection with FIG. 8 below.

The user interface 700 can also include area 645 as shown in FIG. 6. Recall that the area 645 can provide an enrollment attempt history, and can contain notes entered previously by agents 130.

Figure 8:
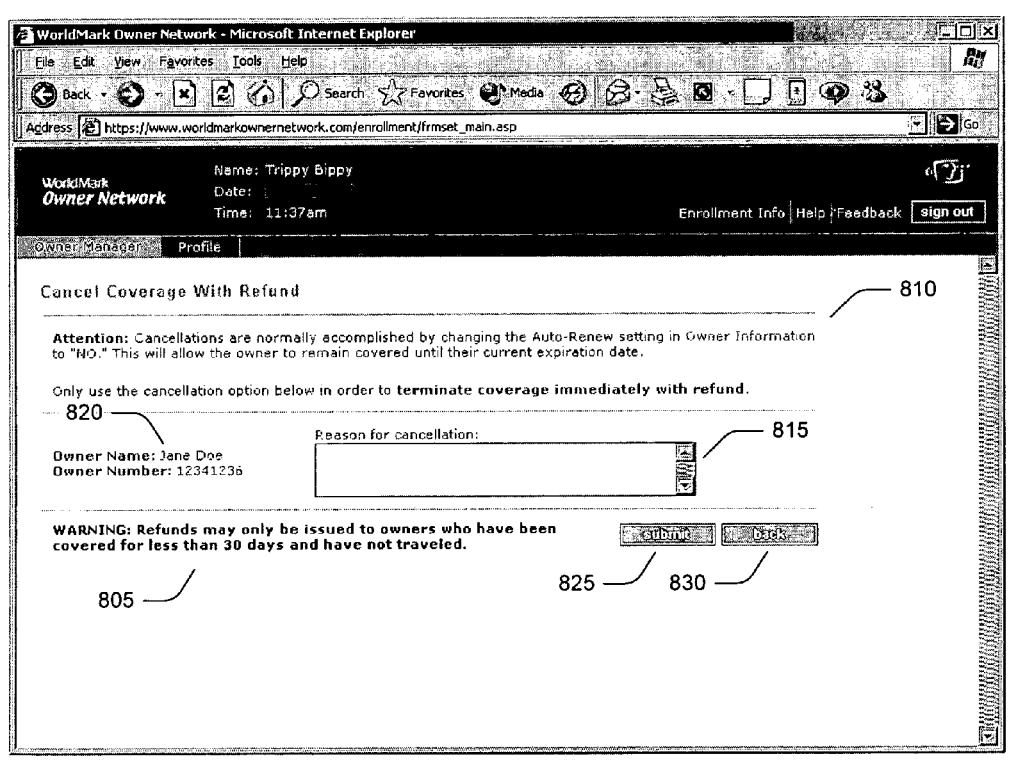
FIG. 8 is a diagram illustrating a user interface that can be presented to the agents in response to clicking a "cancel coverage" button, as shown in FIG. 7.

FIG. 8 illustrates a user interface 800 that can be presented to the contact center agent 130 in response to clicking the button 790 shown in FIG. 7. If the customer 105 chooses to cancel coverage or enrollment, several options for cancellation may be presented to the contact center agent 130. A cancel-refund option enables the customer 105 to receive a refund of any unused payments. A cancel-no-refund option means that the customer 105 receives no refund. A message area 805 can reproduce an illustrative cancellation/refund policy for the convenience of the contact center agent 130, as appropriate. Other areas 810 can further instruct the contact center agent 130 on cancellation policies and procedures.

An area 815 provides an editable area in which the contact center agent 130 can enter reasons for cancellation. Areas 820 are read-only areas indicating the name and number of the given customer 105. When the contact center agent 130 is ready to complete the cancellation, he or she can click button 825 to submit the cancellation. Otherwise, the contact center agent 130 can click button 830 to back out of the user interface 800, in case the contact center agent 130 clicked button 790 in FIG. 7 by mistake.

Figure 9:
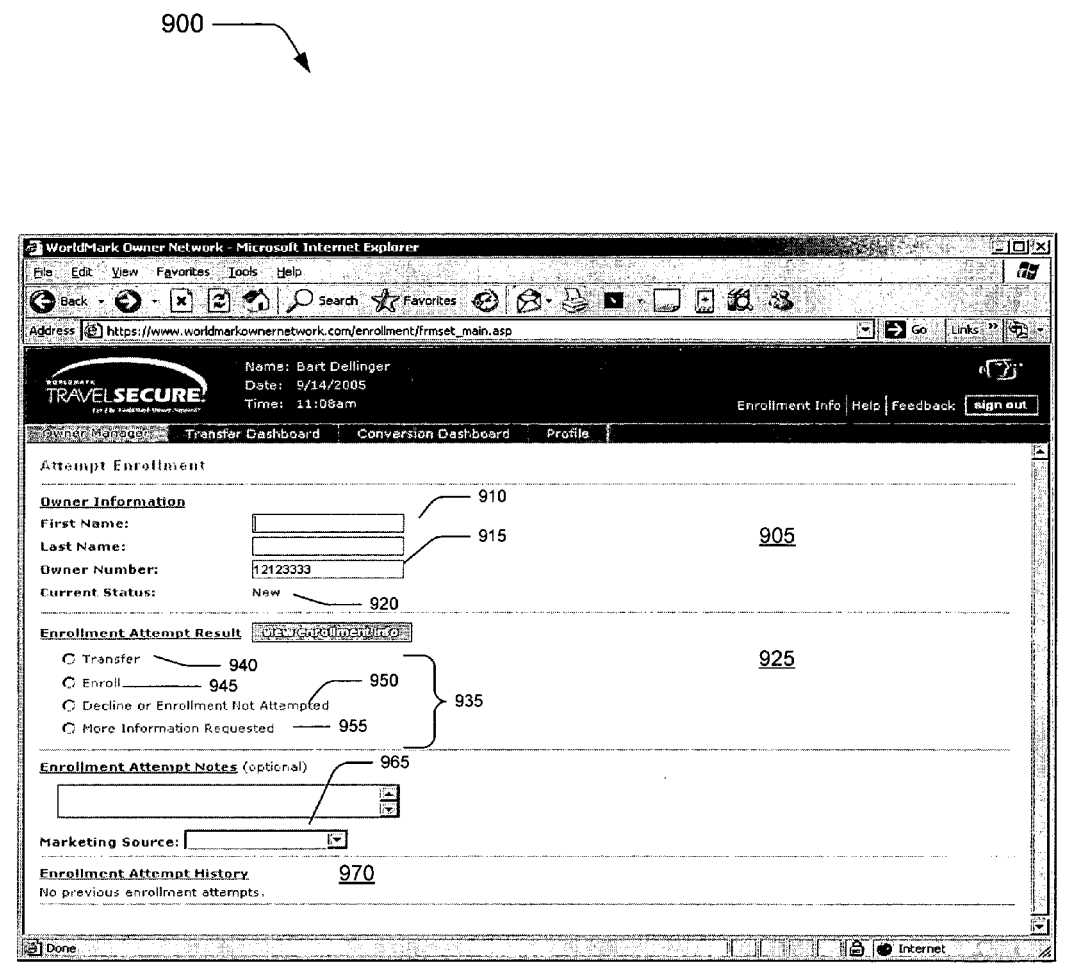

FIG. 9 illustrates a user interface 900 presented to the contact center agent 130 in response to clicking the button 540 shown in FIG. 5. The user interface 900 can enable the contact center agent 130 to offer enrollment to a customer 105 who is not yet enrolled. An area 905 can contain "Owner Information". Within this area 905, the fields 910 can contain the first and last names of the customer 105 who is being offered enrollment. Field 915 can contain an owner number or account number that would be associated with the customer 105 should the customer 105 accept the offer of enrollment. The owner number or account number can be automatically generated and filled into the field 915, or can be created by the contact center agent 130. The owner number or account number can eventually be stored in a record 300 associated with the customer 105, for example in the field 305 shown in FIG. 3. A field 920 can indicate that the current status of the account is "New".

Various fields within area 905 can be automatically populated with known information pertaining to the customer 105. These fields may include one or more of fields 910 or 915. This known information may be manually transferred from previous entries made manually by the contact center agent 130. Alternatively, this known information can be "screen scraped" from user interfaces previous accessed and filled previously by the contact center agent 130. Finally, the fields can be manually filled by the contact center agent 130 for the first time via the user interface 900.

An area 925 can contain a "Sales Attempt Result". If the contact center agent 130 needs additional information to facilitate the offer or sale, answer questions from the customer 105, or overcome concerns expressed by the customer 105, the contact center agent 130 can click button 930. Depending on the result of the sales attempt, the contact center agent 130 can click an appropriate one of the check boxes 935. If the enrollment offer results in a transfer to, for example, another agent 130 and/or contact center 110, the contact center agent 130 clicks box 940. If the enrollment offer is accepted, the contact center agent 130 clicks box 945. If the enrollment offer is declined or if the offer is not made, the contact center agent 130 can click box 950. If the customer 105 requests more information, the contact center agent 130 can click box 955.

In response to which check box 935 is clicked by the contact center agent 130, the status of the account associated with the customer 105 can be updated accordingly in field 920, in a status display within the user interface 900, and/or in the field 335 as shown in FIG. 3.

The contact center agent 130 can enter notes relating to the sales attempt in a field 960, if the agent 130 so chooses. These notes may be beneficial for future reference in later dealings with the customer 105. If the customer 105 was referred or otherwise associated with a marketing source, that source can be entered via, for example, a pop-up list 965. Examples of marketing sources can include, but are not limited to, advertisements in various media (e.g., print media, broadcast media, or the like), referrals from websites, or the like. Finally, an area 970 can list an Enrollment Attempt History, and provide data pertaining to such previous attempts to enroll the given customer 105.

It is understood that the user interface 900 can include a product selector or the like to enable the contact center agent 130 to offer particular products or services to the customer 105.

Figure 9B:
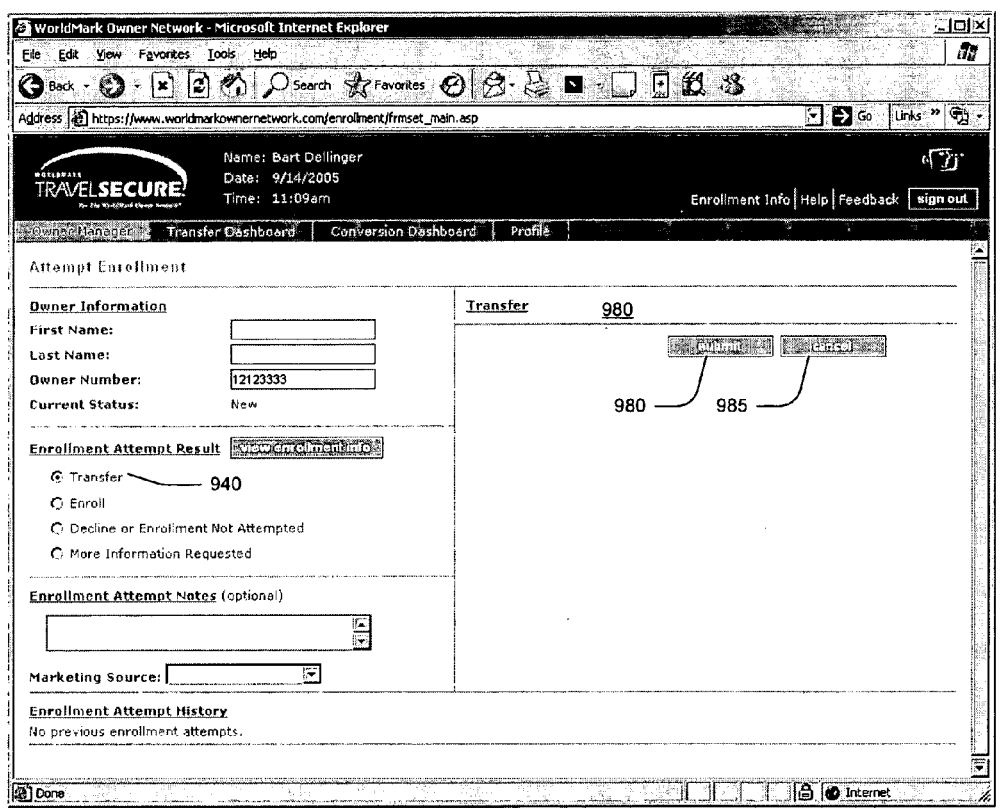
FIG. 9B is a diagram illustrating a variation on the user interface shown in FIG. 9.

FIG. 9B illustrates a variation on the user interface 900, represented generally as user interface 975. This user interface 975 may be presented when the agent 130 checks the box 940 to indicate that a given customer 105 is to be transferred to another agent 130 and/or another contact center 110. An area 980 can be provided to enable the agent 130 to initiate the transfer operation. Accordingly, the area 980 can contain a Submit button 980 and a Cancel button 985. When the agent 130 is ready to transfer the given customer 105, the agent 130 can click the Submit button 980. If the agent mistakenly enters the user interface 900 and does not wish to transfer the given customer 105, the agent 130 can click the Cancel button 985 to back out of the user interface 900.

Figure 10:
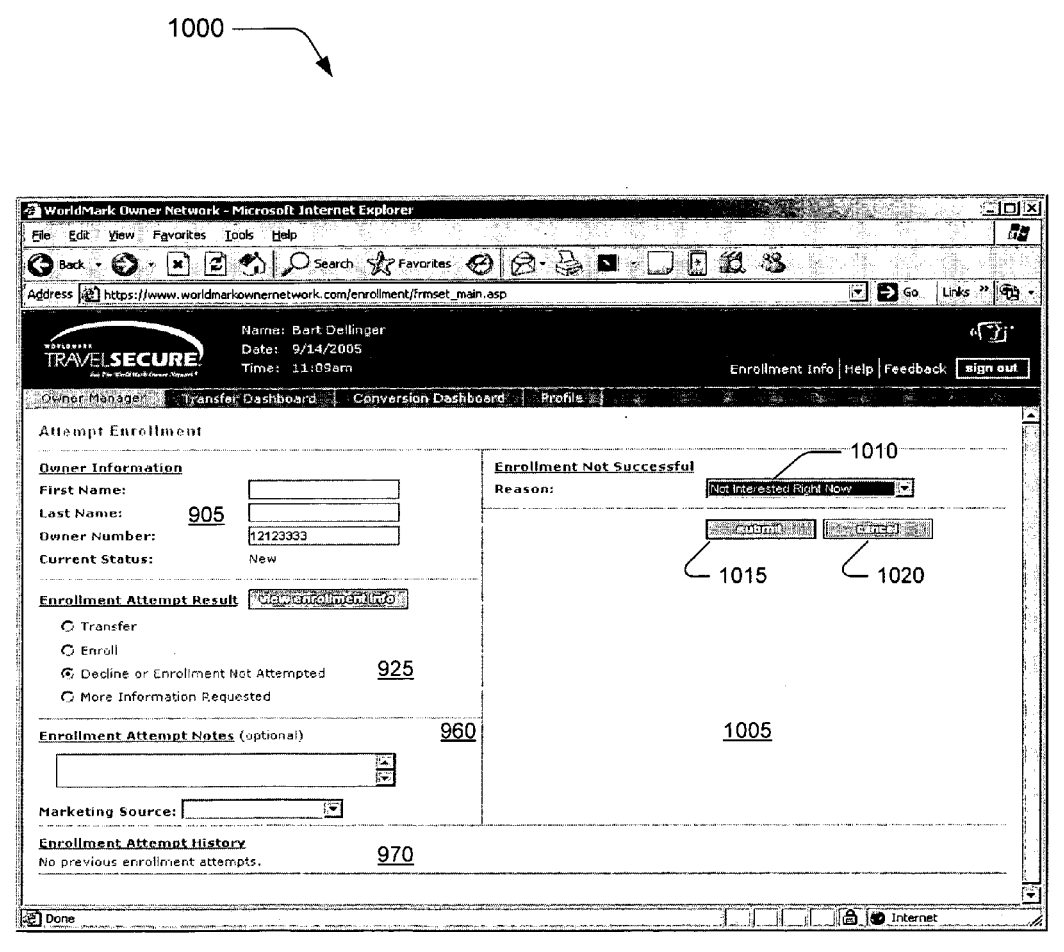

FIG. 10 illustrates a user interface 1000 presented to the contact center agent 130 in response to clicking the check box 950 shown in FIG. 9. Recall that the contact center agent 130 can click check box 950 to indicate that the offer of enrollment was declined or that no offer of enrollment was made.

Some implementations of the user interface 1000 can include the areas 905, 925, 960, and 970 of the user interface 900 shown in FIG. 9. The user interface 1000 can also include an area 1005 that enables the contact center agent 130 to provide further information on the enrollment attempt. For example, a field 1010 can provide a pop-up list of several scenarios, one of which may apply to a given situation. Example entries accessible through the filed 1010 can indicate that the customer 105 is "Not Interested Right Now", "Not Interested—Don't Ask Again", "Sale Not Attempted—Not Enough Time", "Sale Not Attempted—Not Qualified", or the like. This information can be associated with a record 300 associated with the customer 105, and can be stored in, for example, the field 335 shown in FIG. 3.

When the contact center agent 130 has selected an appropriate entry from the field 1010, the contact center agent 130 can click button 1015 to submit the entry for storage in the data store 150. In response to the contact center agent 130 clicking the button 1015, the contents of the field 1010 can be stored in, for example, the field 335 shown in FIG. 3. Afterwards, the agent interface 140 can return to, for example, the user interface 500 shown in FIG. 5, to await the next interaction with a customer 105.

If the contact center agent 130 wishes to back out of the user interface 1000 for any reason, the contact center agent 130 can click button 1020. In response, the agent interface 140 can return to, for example, the user interface 900 shown in FIG. 9.

Figure 11:
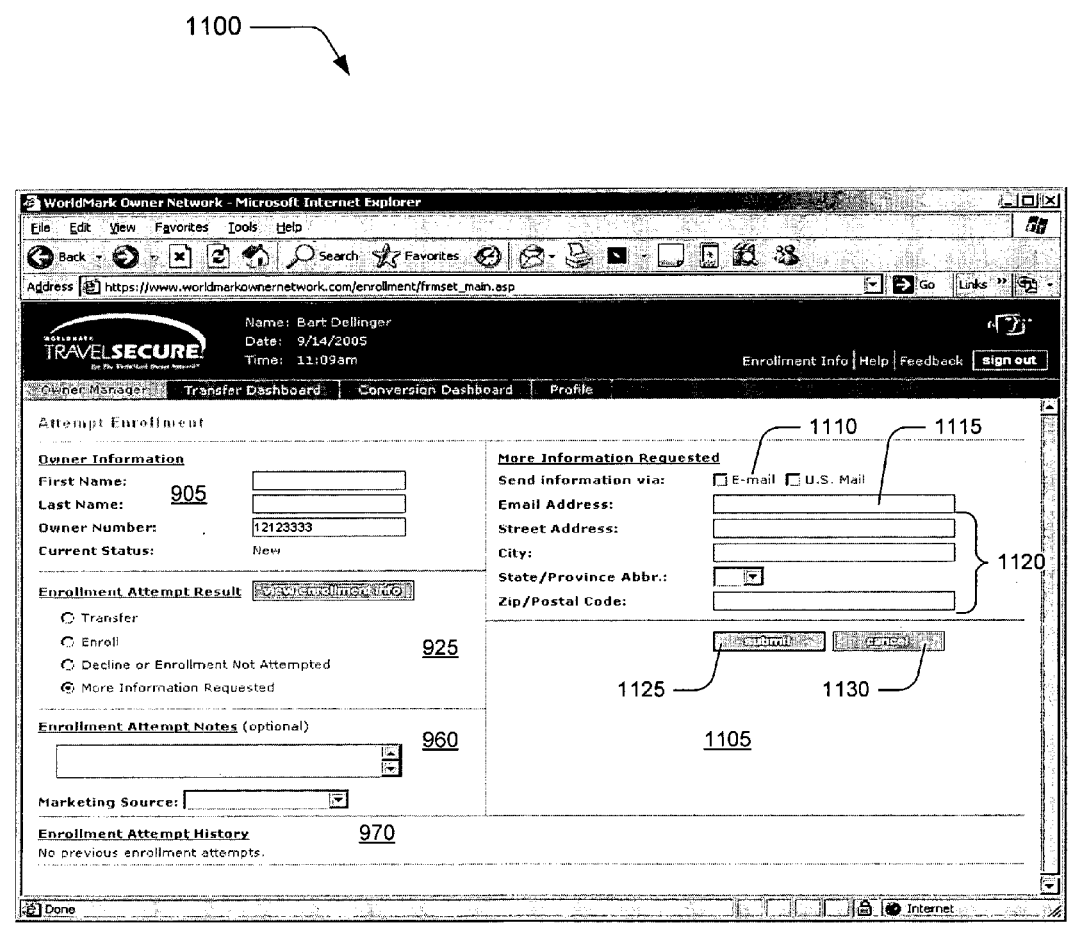

FIG. 11 illustrates a user interface 1100 presented to the contact center agent 130 in response to clicking the check box 955 shown in FIG. 9. Recall that the contact center agent 130 can click check box 955 to indicate that the customer 105 requested additional information about the subject matter of the enrollment offer.

Some implementations of the user interface 1100 can include the areas 905, 925, 960, and 970 of the user interface 900 shown in FIG. 9. The user interface 1100 can also include an area 1105 that enables the contact center agent 130 to provide further information on the sales attempt. For example, within, the area 1105, which can be labeled "More Information Requested", the contact center agent 130 can check an appropriate check box 1110, depending on whether the customer 105 has requested additional information by e-mail or U.S. Mail. A field 1115 can contain an e-mail or similar information associated with the customer 105. A set of fields 1120 can contain address and city/state/ZIP information for the customer 105.

The fields 1115 and 1120 can be manually entered by the contact center agent 130 into the user interface 1100. These fields 1115 and 1120 can also be populated automatically based on data either previously entered manually or screen-scraped from previous screens viewed by the contact center agent 130.

Once the fields within the user interface 1100 have been completed to satisfaction, the contact center agent 130 can click on button 1125 to submit the contents thereof to the data store 150. Data extracted from the fields within the user interface 1100 may be loaded into, for example, appropriate fields 305-335 within the records 300 shown in FIG. 3. Once the data from the user interface 1100 is committed to the data store 150, the agent interface 140 can return to, for example, the user interface 500 shown in FIG. 5 to enable the contact center agent 130 to process the next customer 105.

On the other hand, if the contact center agent 130 entered the user interface 1100 by mistake, or if for some other reason, the data entered into the fields of the user interface 1100 should not be committed to the data store 150, the contact center agent 130 can click the button 1130 to cancel-out of the user interface 1100. If the contact center agent 130 clicks the button 1130, the agent interface 140 can return the contact center agent 130 to, for example, the user interface 1000 shown in FIG. 10. From the user interface 1000, the contact center agent 130 can disposition the interaction with the customer 105 appropriately.

Figure 12:
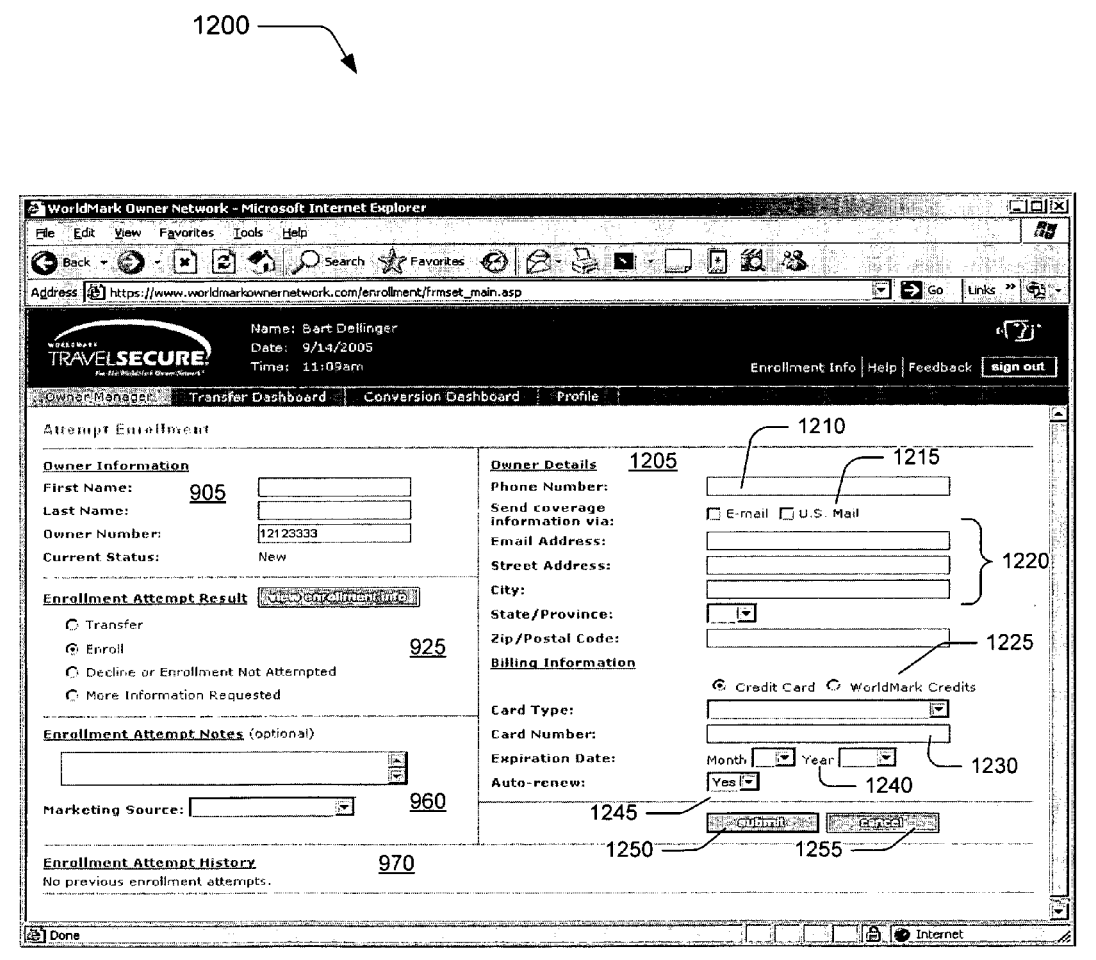

FIG. 12 illustrates a user interface 1200 presented to the contact center agent 130 in response to clicking the check box 940 shown in FIG. 9. Recall that the contact center agent 130 can click check box 940 to indicate that the customer 105 has accepted the enrollment offer.

Some implementations of the user interface 1200 can include the areas 905, 925, 960, and 970 of the user interface 900 shown in FIG. 9. The user interface 1200 can also include an area 1205 that enables the contact center agent 130 to provide further information on the sales attempt. Within area 1205, a field 1210 can contain the telephone number of the customer 105. One of the check boxes 1215 can be checked to indicate whether enrollment materials should be e-mailed or mailed to the customer 105. Fields 1220 can contain street address, city, and ZIP information for the customer 105. For convenience but not limitation, the fields 1210-1220 can be grouped under a heading such as "Owner Details", as shown in FIG. 12.

The contact center agent 130 can check one of the checkboxes 1225 to indicate whether the enrollment is to be paid for using a credit card, or by redemption of credits or other points earned by the customer 105. Field 1230 can contain a pop-up list of various credit card types, or of other types of payment instruments. Field 1235 can contain an account number of the payment instrument chosen from field 1230. Fields 1240 can contain an expiration date of the payment instrument whose number was entered into field 1235. The expiration date can be expressed, for example, in month/year format. Finally, field 1245 can indicate whether the enrollment of the customer 105 is to auto-renew after expiration of some membership term. For convenience but not limitation, the fields 1225-1245 can be grouped under a heading such as "Billing Information", as shown in FIG. 12.

Once the fields within the user interface 1200 have been completed to satisfaction, the contact center agent 130 can click on button 1250 to submit the contents thereof to the data store 150. Data extracted from the fields within the user interface 1200 may be loaded into, for example, appropriate fields 305-335 within the records 300 shown in FIG. 3.

On the other hand, if the contact center agent 130 entered the user interface 1200 by mistake, or if for some other reason, the data entered into the fields of the user interface 1200 should not be committed to the data store 150, the contact center agent 130 can click the button 1255 to cancel-out of the user interface 1200. If the contact center agent 130 clicks the button 1255, the agent interface 140 can return the contact center agent 130 to, for example, the user interface 1000 shown in FIG. 10. From the user interface 1000, the contact center agent 130 can disposition the interaction with the customer 105 appropriately.

It is understood that the data entered into the various fields shown in FIG. 12 can be manually populated by the contact center agent 130, or can be automatically populated using "screen scraping" techniques.

Figure 13:
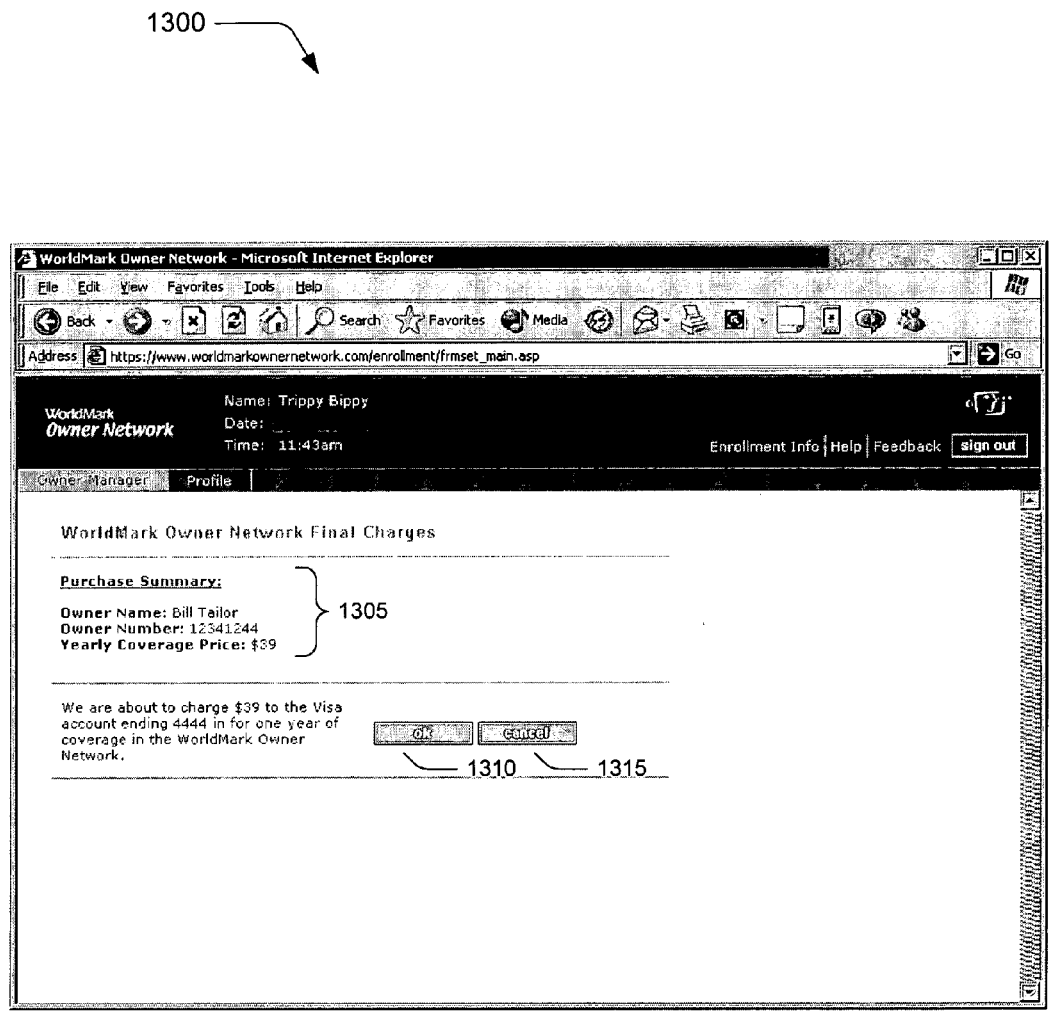
FIG. 13 is a diagram illustrating a user interface presented to the agents as a confirmation page after agents click a "submit" button, as shown in FIG. 12.

FIG. 13 illustrates a user interface 1300 presented to the contact center agent 130 as a confirmation page after the contact center agent 130 clicks the submit button 1255 shown in FIG. 12. An area 1305 provides a purchase summary of the enrollment offer accepted by the customer 105. If everything appears to be satisfactory with the enrollment, the contact center agent 130 can click the "ok" button 1310 to submit the enrollment for processing. Otherwise, the contact center agent 130 can back-out of the user interface 1300 by clicking the cancel button 1315.

Figure 14:
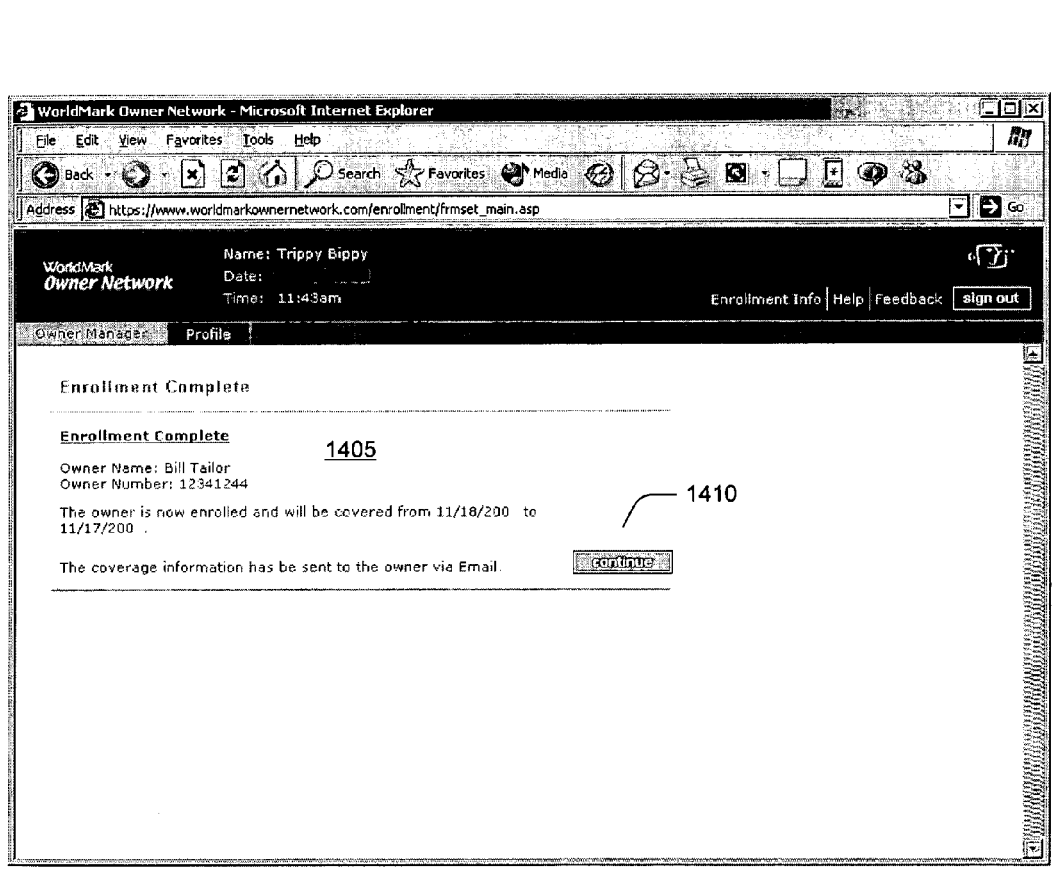
FIG. 14 is a diagram illustrating a user interface presented to the agents as a notification page after the agents click an "ok" button, as shown in FIG. 13, to submit a new enrollment.

FIG. 14 illustrates a user interface 1400 presented to the contact center agent 130 as a notification page after the contact center agent 130 clicks the button 1310 shown in FIG. 13 to submit the new enrollment. An area 1405 provides a purchase summary of the submitted enrollment offer. When the contact center agent 130 is ready to proceed, he or she can click the "continue" button 1310. Afterwards, the user interface 1400 can return the contact center agent 130 to, for example, the user interface 500 shown in FIG. 5 to await the next interaction with a customer 105.

Figure 15:
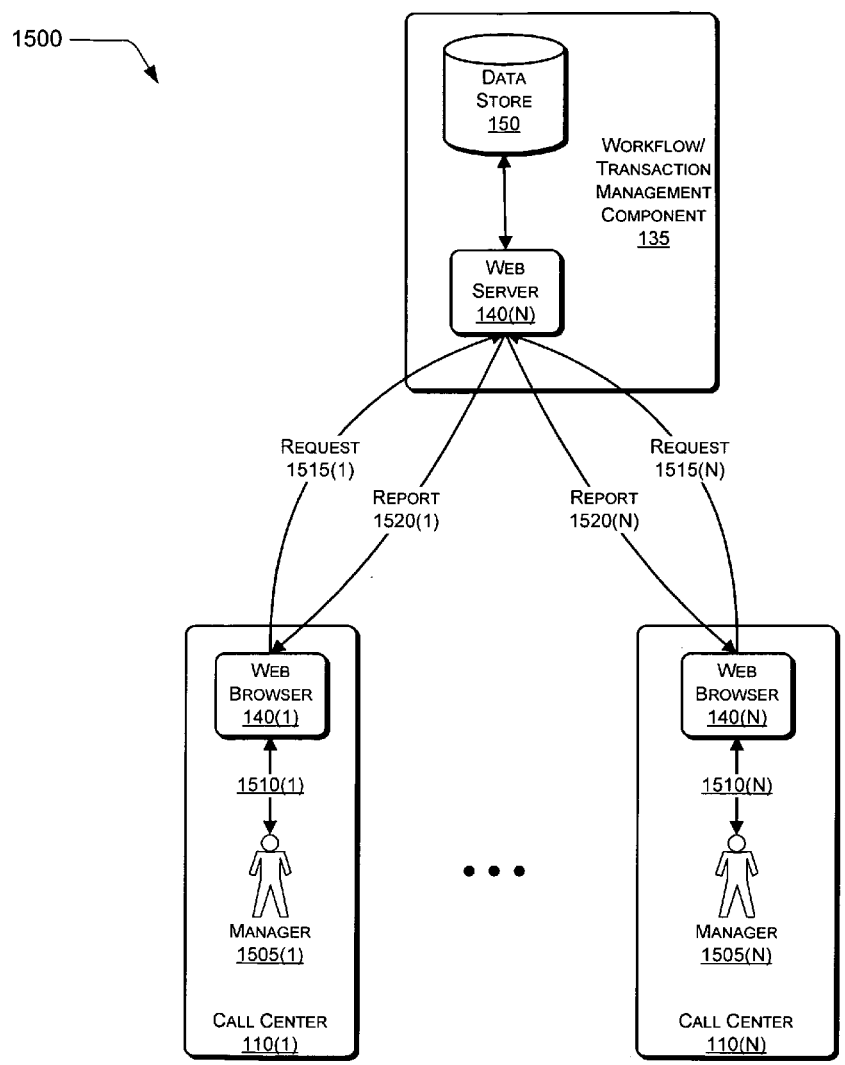
FIG. 15 is a block diagram illustrating an architecture for enabling managers to monitor performance metrics relating to contact centers and to obtain reports detailing the same.

FIG. 15 illustrates an architecture 1500 for enabling managers 1505 to monitor performance metrics relating to the contact centers 110, and to obtain reports detailing the same. The managers 1505 are referenced individually as managers 1505(1) and 1505(N), and collectively as managers 1505. While FIG. 15 shows one manager 1505 in each contact center 110 for clarity and conciseness, it is understood that any number of managers 1505 could be associated with each contact center 110. It is further understood that N contact centers 110 can be included in the architecture 1500, with N being any integer greater than one. Generally speaking, the managers 1505 are supervisors or administrators, relative to the contact center agents 130 discussed herein.

In addition to facilitating the integrated transaction flows described above, the transaction management component 135 can also support the reporting of performance metrics to the managers 1505 shown in FIG. 15. These reports can be requested, received, and viewed by the managers 1505 in connection with the agent interfaces 140 discussed above. For convenience of illustration and discussion, but not limitation, the data and communications between the managers 1505 and the agent interfaces 140 are represented generally by the references 1510(1) and 1510(N), collectively, data 1510. The requests for particular performance metrics or reports submitted by the managers 1505 as transmitted from the agent interfaces 140 to the data store 150 are represented generally by the references 1515(1) and 1515(N), collectively, requests 1515. The performance metrics or reports provided in response to those requests 1515 are represented generally by the references 1520(1) and 1520(N), collectively, reports 1520.

Various types of the reports 1520 can be provided. The following examples of the reports 1520 are described below:

1. User Overview—report summarizing all the user accounts (e.g., owner, enrolled owners, enrollment agents, contact center agents, call center healthcare providers) and the status of these accounts (e.g., none, authorized, initialized, cancelled/disabled).

2. User Activity—date range report summarizing changes in account status (e.g., none, authorized, initialized, cancelled/disabled) for each of the account types (e.g., owner, enrolled owners, enrollment agents, contact center agents, contact center healthcare providers).

3. System Activity—date range report summarizing system usage/logins for each account type.

4. Enrollment Summary—date range report summarizing sales attempts and changes in enrollment status for a contact center. This report can include enrollment agent enrollments, online enrollments, and auto-renew enrollments, in addition to cancellations/expirations.

5. Online Enrollment Summary—date range report summarizing online sales attempts and changes in enrollment status for owners signing up online without the aide of an enrollment agent.

6. Enrollment Agent Summary (detailed)—date range report for a single enrollment agent specifying number of sales attempts, declined, enrolled, need info, and other information on both a periodic basis and a daily basis.

7. Enrollment Agent Summary (list)—date range report for an enrollment center that individually lists all enrollment agents and their sales results for the date range. Sales results data can include, for example, attempts, enrollments, declined, cancelled, more info, etc.

8. More info request list—date range report for an enrollment center that lists all owners and their addresses who have requested that more information be sent to them via mail. This list can be exported into comma-separated values (CSV) format, imported into word processing or spreadsheet applications, and mailing labels can printed therefrom. It is understood that other formats may be suitable for exporting as well, including but not limited to formats delimited by tabs or other characters.

9. Enrollment Status Change List—date range report for an enrollment center that lists owners who are either newly subscribed or have newly cancelled/expired. The list can also include addresses for the owners.

10. Demographic Sales Report—date range report for an enrollment center that breaks down sales attempts by state/province. Declined users who have no demographic information can also be included.

11. Email List—date range report for an enrollment center that lists the name, owner number, and email address for owners who have newly enrolled or requested that more information be sent to them via email.

Figure 16:
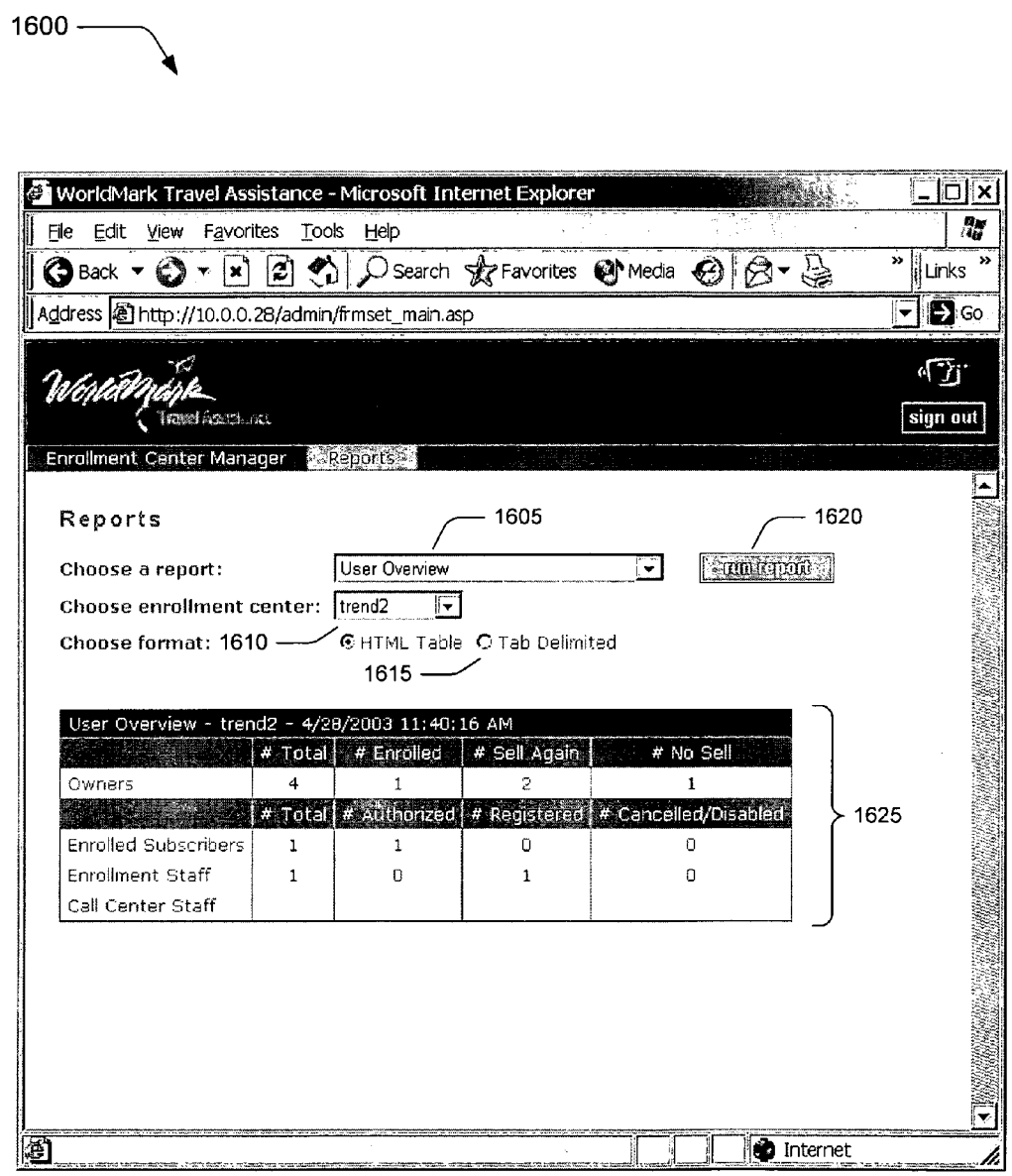
FIG. 16 is a diagram illustrating a user interface that presents a "User Overview" report to a manager.

FIG. 16 illustrates a user interface 1600 presented to the managers 1505 to clicking request reports 1520. A manager 1505 can activate pop-up list 1605 to scroll through a list of supported reports 1520. The manager 1505 can also activate pop-up list 1610 to scroll through a list of contact centers 110 on which to run the reports 1520. The manager 1505 can also check one of the boxes 1615 to select either a report 1520 formatted as an HTML table or as a tab-delimited table. Once the report parameters are set to the satisfaction of the manager 1505, the manager 1505 clicks the button 1620 to run the report 1520. Afterwards, the results of the report 1520 can appear in an area 1625.

In the user interface 1600 shown in FIG. 16, the manager 1505 has requested a "User Overview" report, as listed above. Illustrative contents of such a report 1520 are shown in area 1625 of the user interface 1600.

Figure 17:
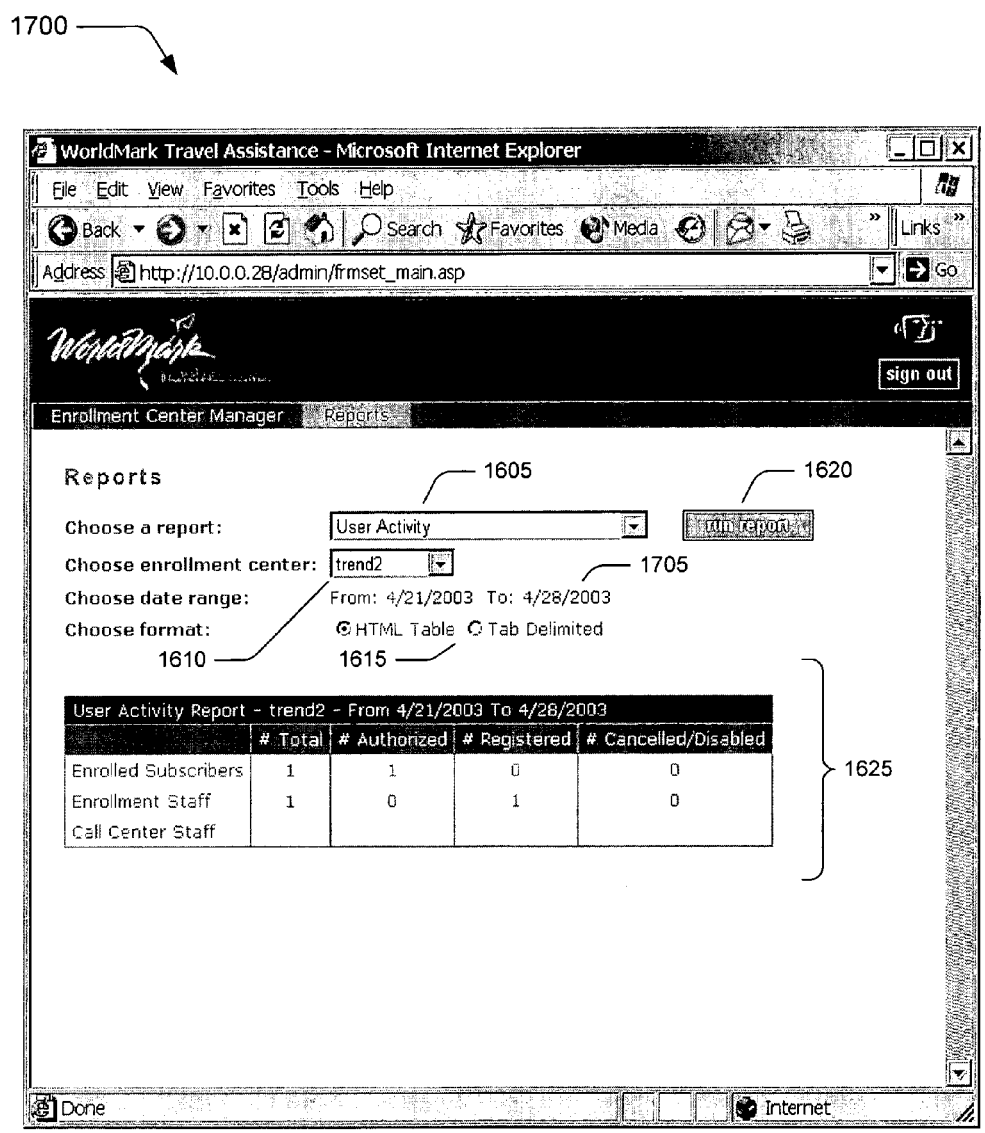
FIG. 17 is a diagram illustrating a user interface that presents a "User Activity" report to a manager.

FIG. 17 illustrates a user interface 1700 presenting a "User Activity" report to a manager 1505. Fields 1605, 1610, and 1615 are carried over form FIG. 16, as well as button 1620. Field 1705 enables the manager 1505 to specify a date range over which the report 1520 is to be run. The area 1625 contains illustrative contents of the "User Activity" report.

Figure 18:
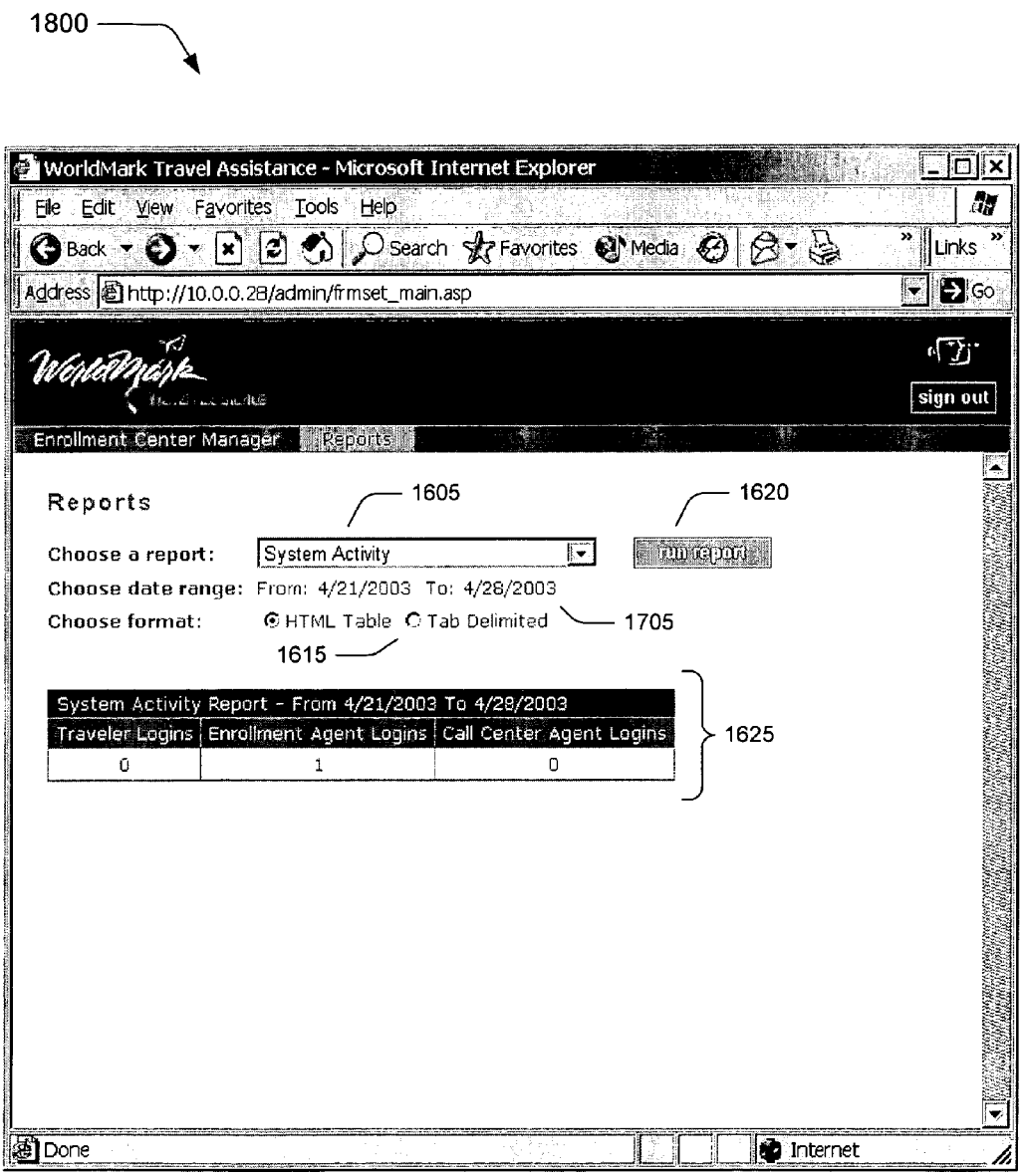
FIG. 18 is a diagram illustrating a user interface that presents a "System Activity" report to a manager.

FIG. 18 illustrates a user interface 1800 presenting a "System Activity" report to a manager 1505. Fields 1605 and 1615 are carried over form FIG. 16, as well as button 1620. Field 1705 enables the manager 1505 to specify a date range over which the report 1520 is to be run. The area 1625 contains illustrative contents of the "System Activity" report.

FIG. 19 illustrates a user interface 1900 presenting an "Enrollment Summary" report to a manager 1505. Fields 1605, 1610, and 1615 are carried over form FIG. 16, as well as button 1620. Field 1705 enables the manager 1505 to specify a date range over which the report 1520 is to be run. The area 1625 contains illustrative contents of the "Enrollment Summary" report.

Figure 20:
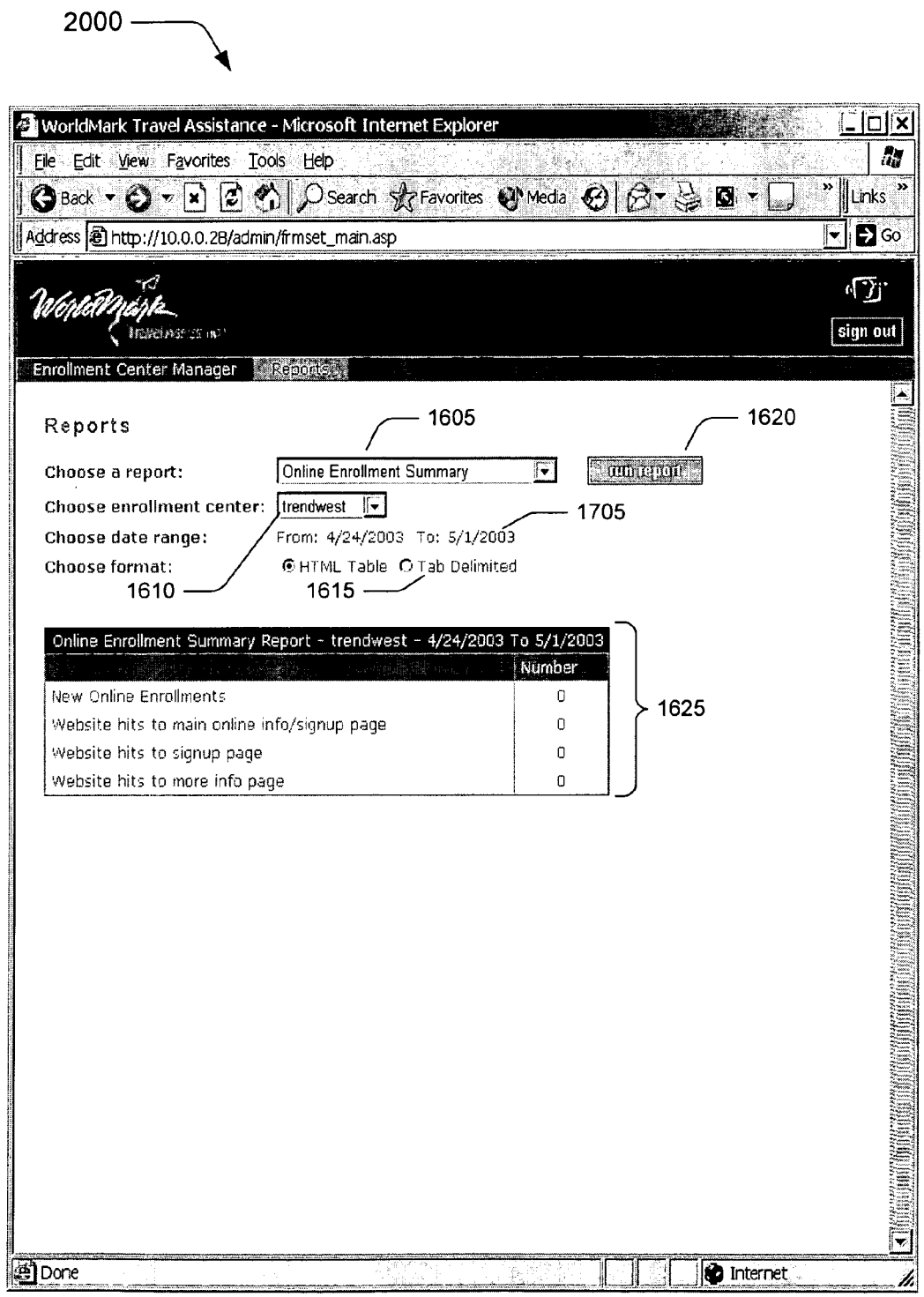
FIG. 20 is a diagram illustrating a user interface that presents an "Online Enrollment Summary" report to a manager.

FIG. 20 illustrates a user interface 2000 presenting an "Online Enrollment Summary" report to a manager 1505. Fields 1605, 1610, and 1615 are carried over form FIG. 16, as well as button 1620. Field 1705 enables the manager 1505 to specify a date range over which the report 1520 is to be run. The area 1625 contains illustrative contents of the "Online Enrollment Summary" report.

Figure 21:
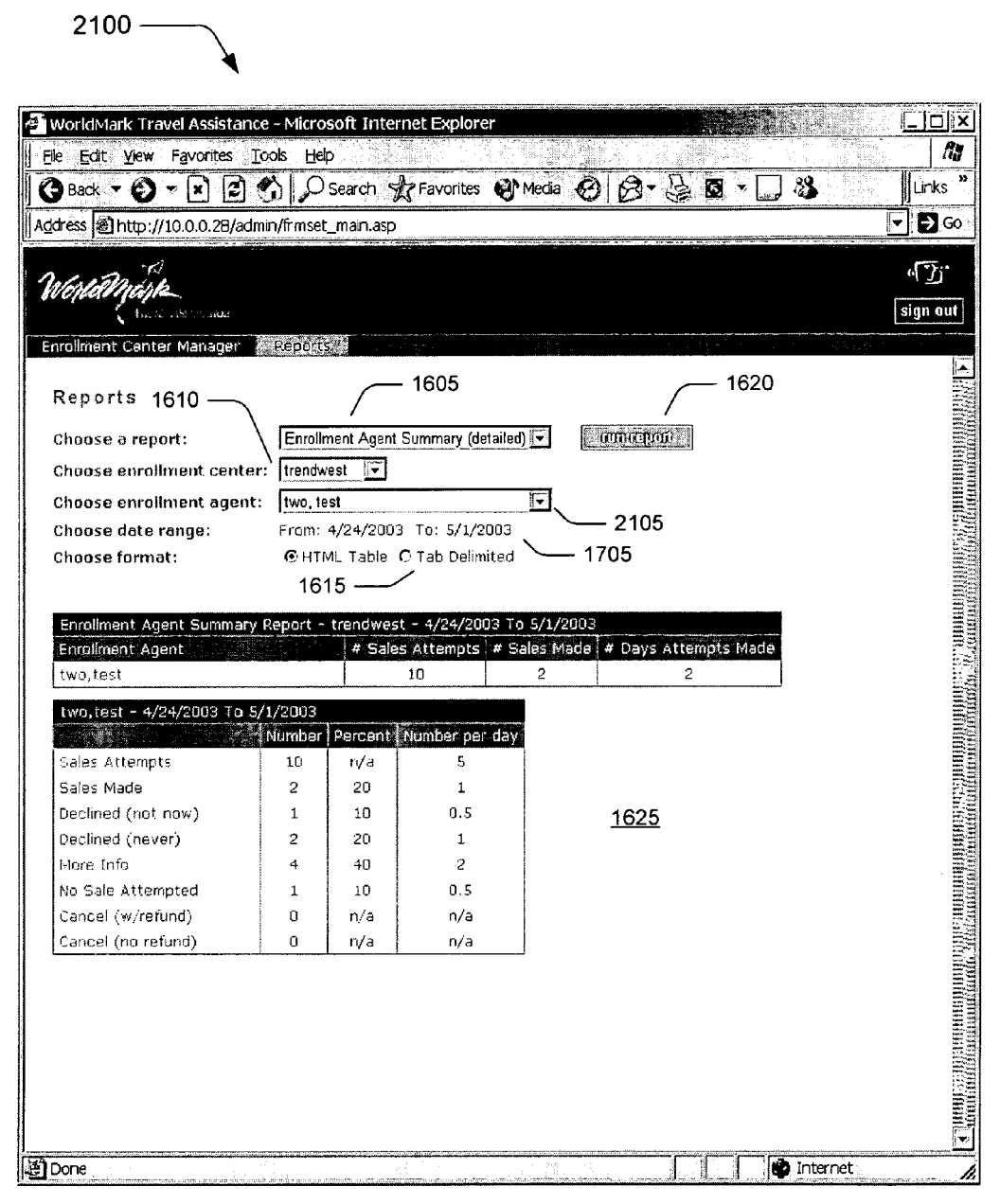

FIG. 21 illustrates a user interface 2100 presenting an "Enrollment Agent Summary (detailed)" report to a manager 1505. Fields 1605, 1610, and 1615 are carried over form FIG. 16, as well as button 1620. Field 1705 enables the manager 1505 to specify a date range over which the report 1520 is to be run. A field 2105 enables the manager 1505 to select a given agent 130 on whom the report 1520 is to be run. The area 1625 contains illustrative contents of the "Enrollment Agent Summary (detailed)" report.

Figure 22:
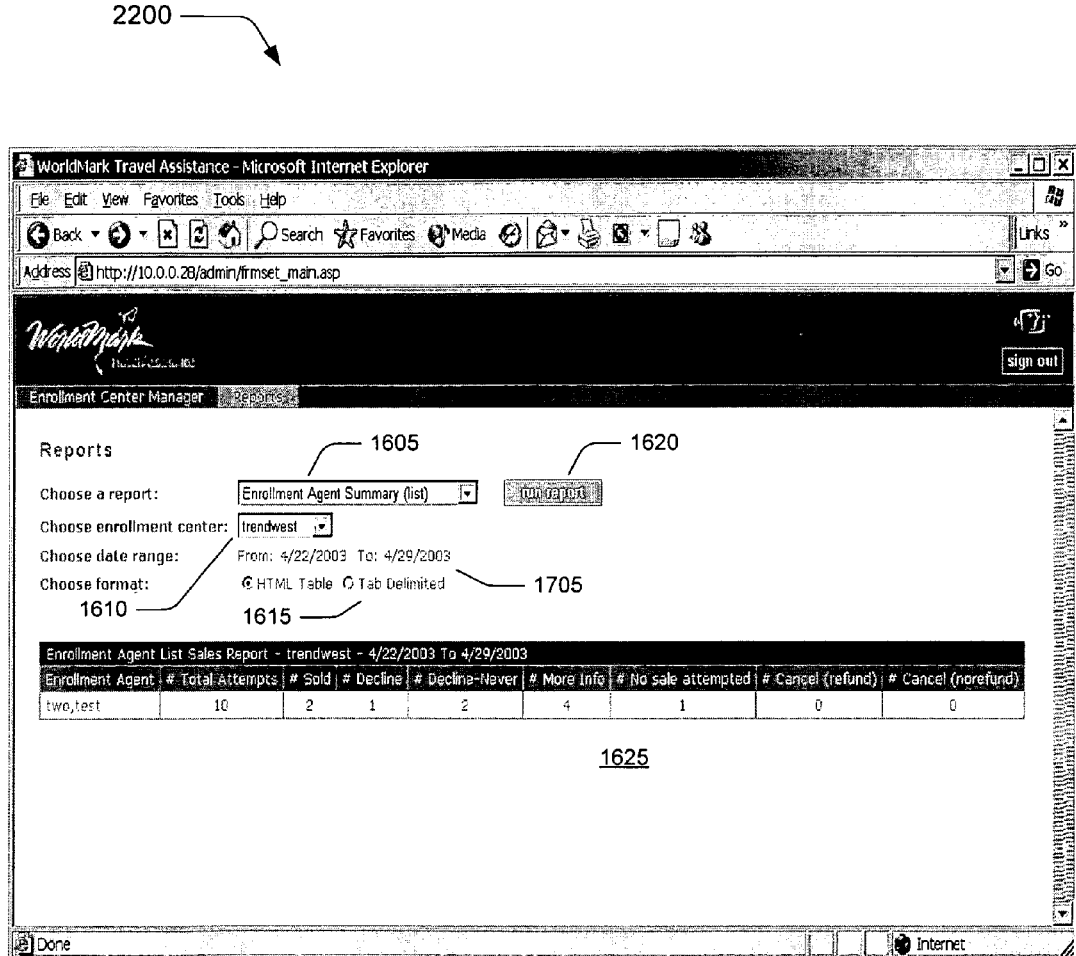
FIG. 22 is a diagram illustrating a user interface that presents an "Enrollment Agent Summary (list)" report to a manager.

FIG. 22 illustrates a user interface 2200 presenting an "Enrollment Agent Summary (list)" report to a manager 1505. Fields 1605, 1610, and 1615 are carried over from FIG. 16, as well as button 1620. Field 1705 enables the manager 1505 to specify a date range over which the report 1520 is to be run. The area 1625 contains illustrative contents of the "Enrollment Agent Summary (list)" report.

Figure 23:
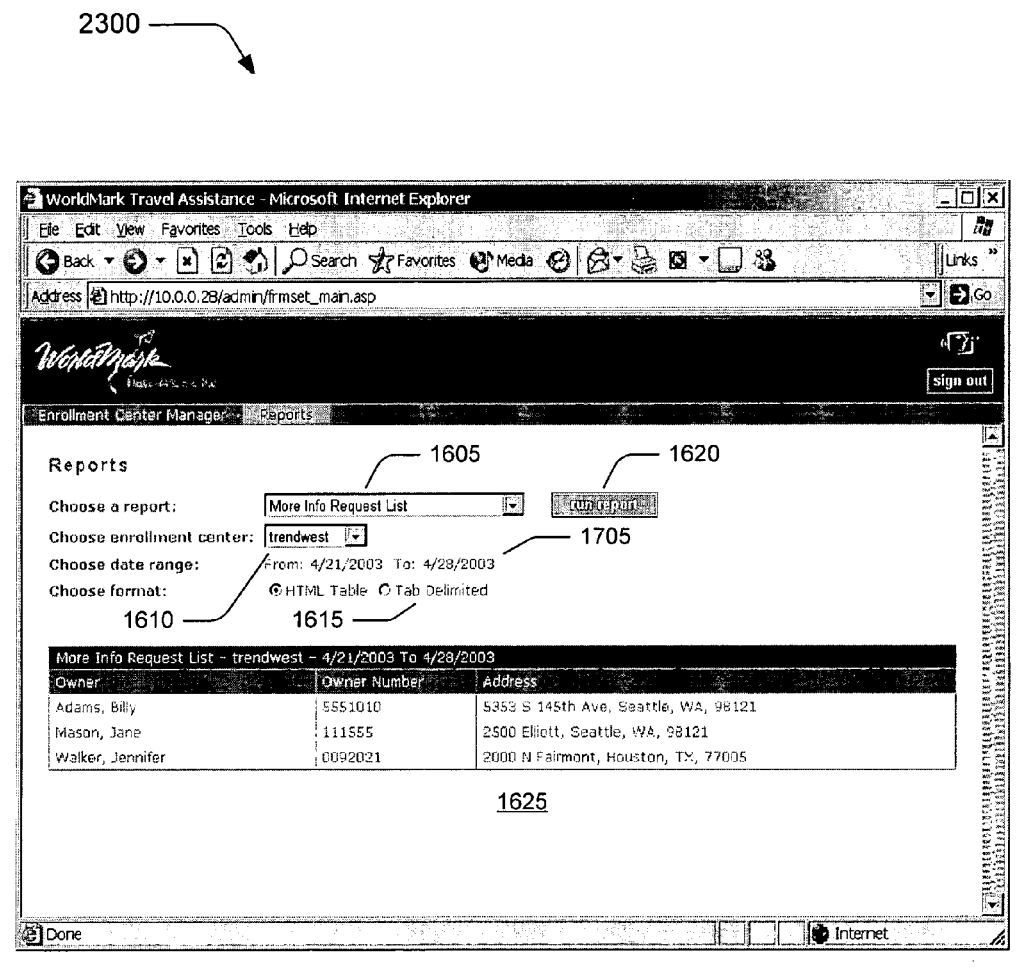

FIG. 23 illustrates a user interface 2300 presenting a "More Info Request List" report to a manager 1505. Fields 1605, 1610, and 1615 are carried over form FIG. 16, as well as button 1620. Field 1705 enables the manager 1505 to specify a date range over which the report 1520 is to be run. The area 1625 contains illustrative contents of the "More Info Request List" report.

Figure 24:
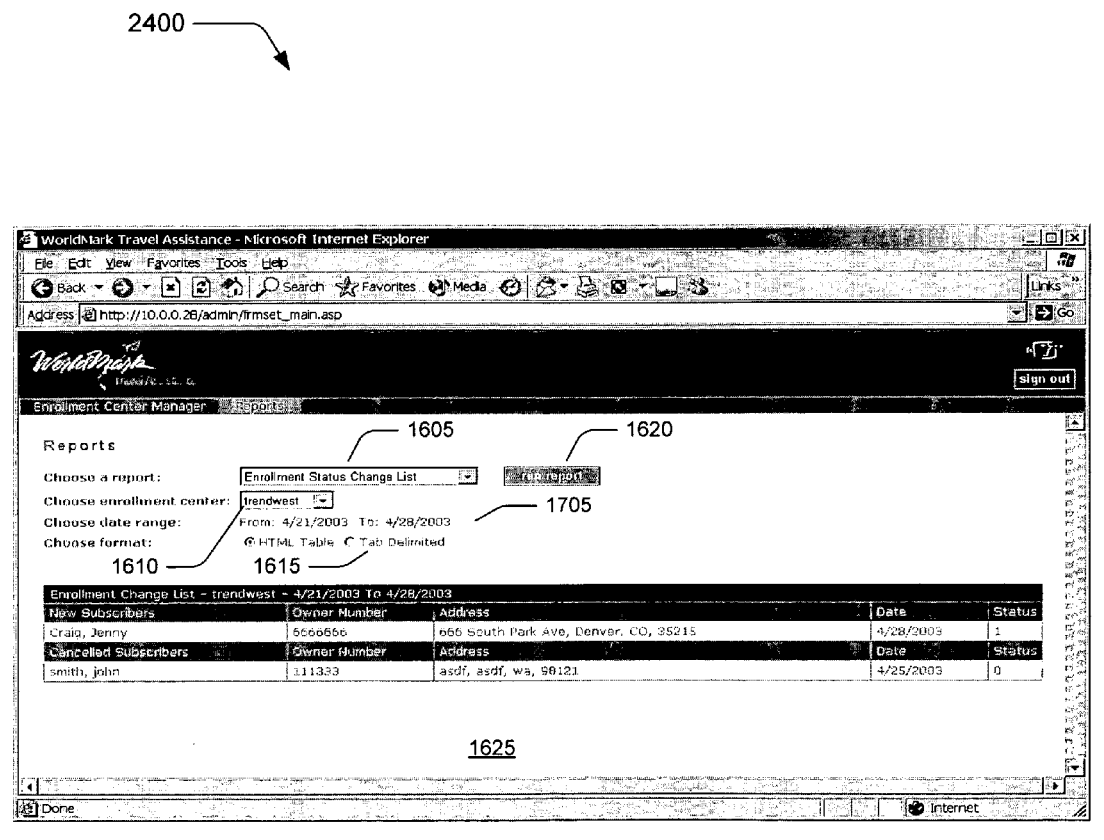

FIG. 24 illustrates a user interface 2400 presenting an "Enrollment Status Change List" report to a manager 1505. Fields 1605, 1610, and 1615 are carried over form FIG. 16, as well as button 1620. Field 1705 enables the manager 1505 to specify a date range over which the report 1520 is to be run. The area 1625 contains illustrative contents of the "Enrollment Status Change List" report.

FIG. 25 illustrates a user interface 2500 presenting a "Demographic Sales Report" report to a manager 1505. Fields 1605, 1610, and 1615 are carried over form FIG. 16, as well as button 1620. Field 1705 enables the manager 1505 to specify a date range over which the report 1520 is to be run. The area 1625 contains illustrative contents of the "Demographic Sales Report", listing statistics organized by geographic regions.

Figure 26:
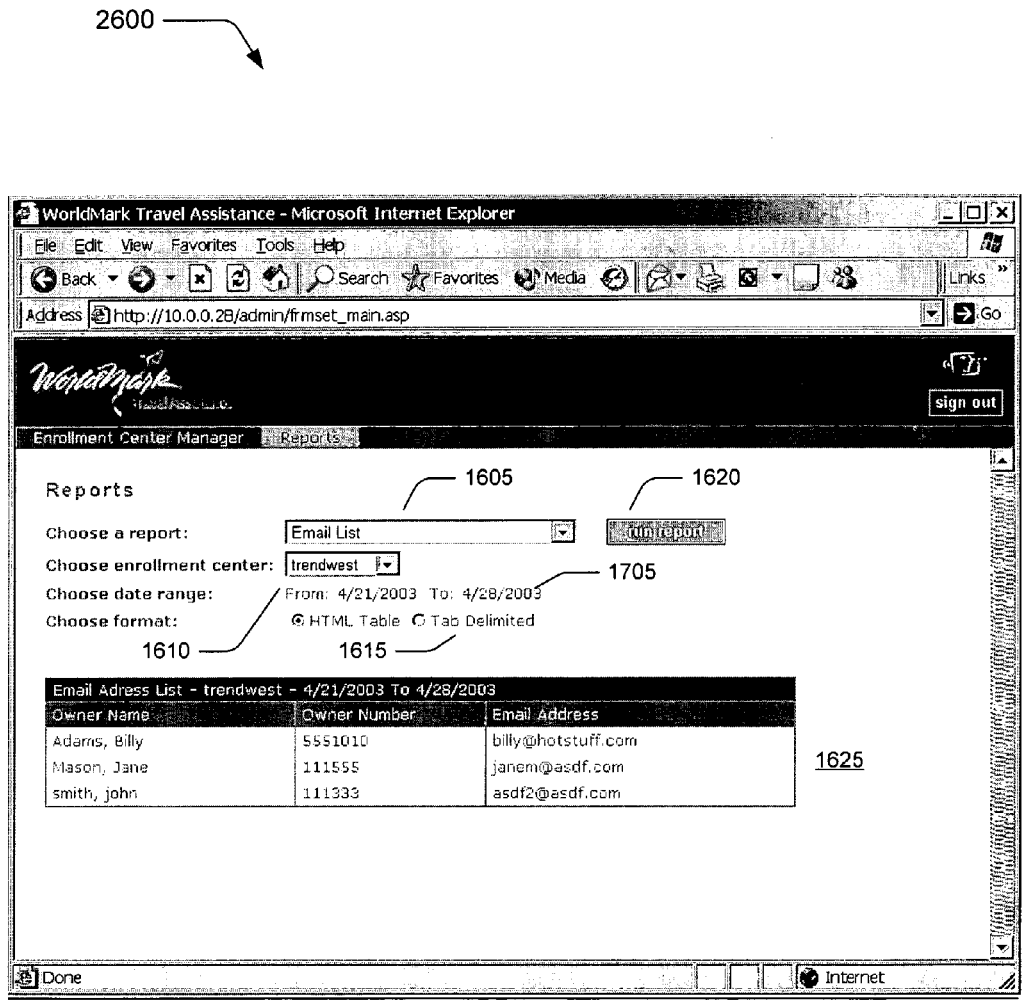
FIG. 26 is a diagram illustrating a user interface that presents an "Email List" report to a manager.

FIG. 26 illustrates a user interface 2600 presenting an "Email List" report to a manager 1505. Fields 1605, 1610, and 1615 are carried over form FIG. 16, as well as button 1620. Field 1705 enables the manager 1505 to specify a date range over which the report 1520 is to be run. The area 1625 contains illustrative contents of the "Email List" report, listing a plurality of e-mail addresses and account numbers for customers 105.

Figure 27:
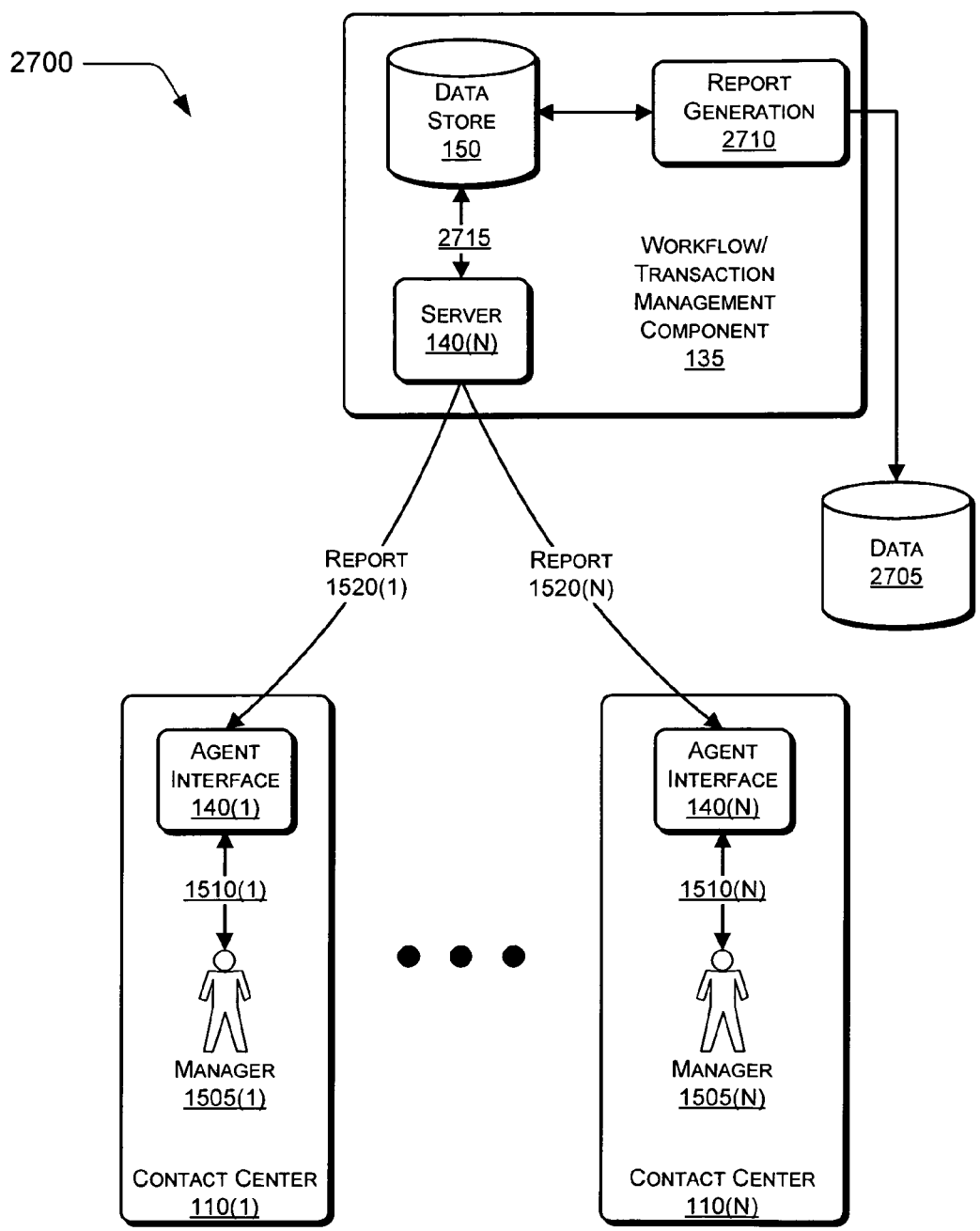
FIG. 27 is a block diagram illustrating an architecture by which a workflow management component can serve as an intermediary between two or more contact centers to facilitate cross-referencing and reporting on transactional workflows distributed across the two or more contact centers.

FIG. 27 illustrates an architecture 2700 by which the workflow management component 135 can serve as an intermediary between two or more contact centers 110. Because the workflow management component 135 receives data from the contact centers 110 and generates reports 1520 therefrom, the workflow management component 135 is positioned to cross-reference the data resulting from transactions integrated across two or more of the contact centers 110. Having cross-referenced this data, the workflow management component 135 can enable conclusions to be drawn therefrom and placed in a report 2705 by a report generation component 2710. The data that is cross-referenced and used to generate the report 2705 is represented generally in FIG. 27 by the reference 2715. The data 2715 is pulled from the data store 150, and originates from transactions or other interactions between customers 105 and agents 130 at various contact centers 110.

These reports 2705 can be used to optimize how components of the integrated transactional workflows are handled across different contact centers 110. Additionally, the resulting from this cross-referencing and related analysis can be provided to the contact centers 110 for their review. These reports 2705 may provide an additional revenue stream for the entity associated with the workflow management component 135, whether the reports 2705 are provided alone or in connection with related consulting services.

It is understood that any data 2715 used to generate the reports 2705 and included in such reports 2705 may be processed before being provided to third parties, so as to remove any information that is private, confidential, or otherwise sensitive in nature. In some instances, data may be reported in an aggregated basis, rather than on an individual basis, thereby avoiding disclosure of private details related to individual transactions. For example, rather than reporting that "John Smith and Jane Doe of Anytown, USA reserved a time-share in Cancun for a week in March", the workflow management component 135 could report that "X residents of Anytown, USA reserved a time-share in Cancun".

As an example of the foregoing, analysts using the workflow management component 135 may review the reports 1520 described above, identify those individual agents 130 at particular contact centers 110 that have the highest individual conversion ratios, and attempt to route given customers 105 from a first one of these agents 130(1) to a second one of these agents 130(N). The rationale in this example is to drive maximum value from the overall interaction with the customer 105 by forming "teams" of two or more particular agents 130 who perform highly on an individual basis. When a customer 105 interacts with a first agent 130 on the "team", the workflow management component 135 can subsequently route the customer 105 to other members of the team to handle other parts of an integrated workflow. This "team" construct can be maintained exclusively by the workflow management component 135, or can be shared with the contact centers 110, depending on the circumstances of particular implementations of the subject matter described herein.

Extending the previous example, the workflow management component 135 may also examine past data 2715 to identify which agents 130 at different contact centers 110 have performed particularly well together when handling different aspects of a given integrated workflow. Put another way, the example described in the preceding paragraph centers on the individual performance characteristics of the agents 130 to form "teams" of agents 130 going forward. The example in this paragraph centers on how the agents 130 have already performed together as a "team", and identifies these "teams".

The foregoing examples are merely illustrative of the types of analysis made possible by the workflow management component 135, and do not limit the subject matter described or claimed herein.

Figure 28:
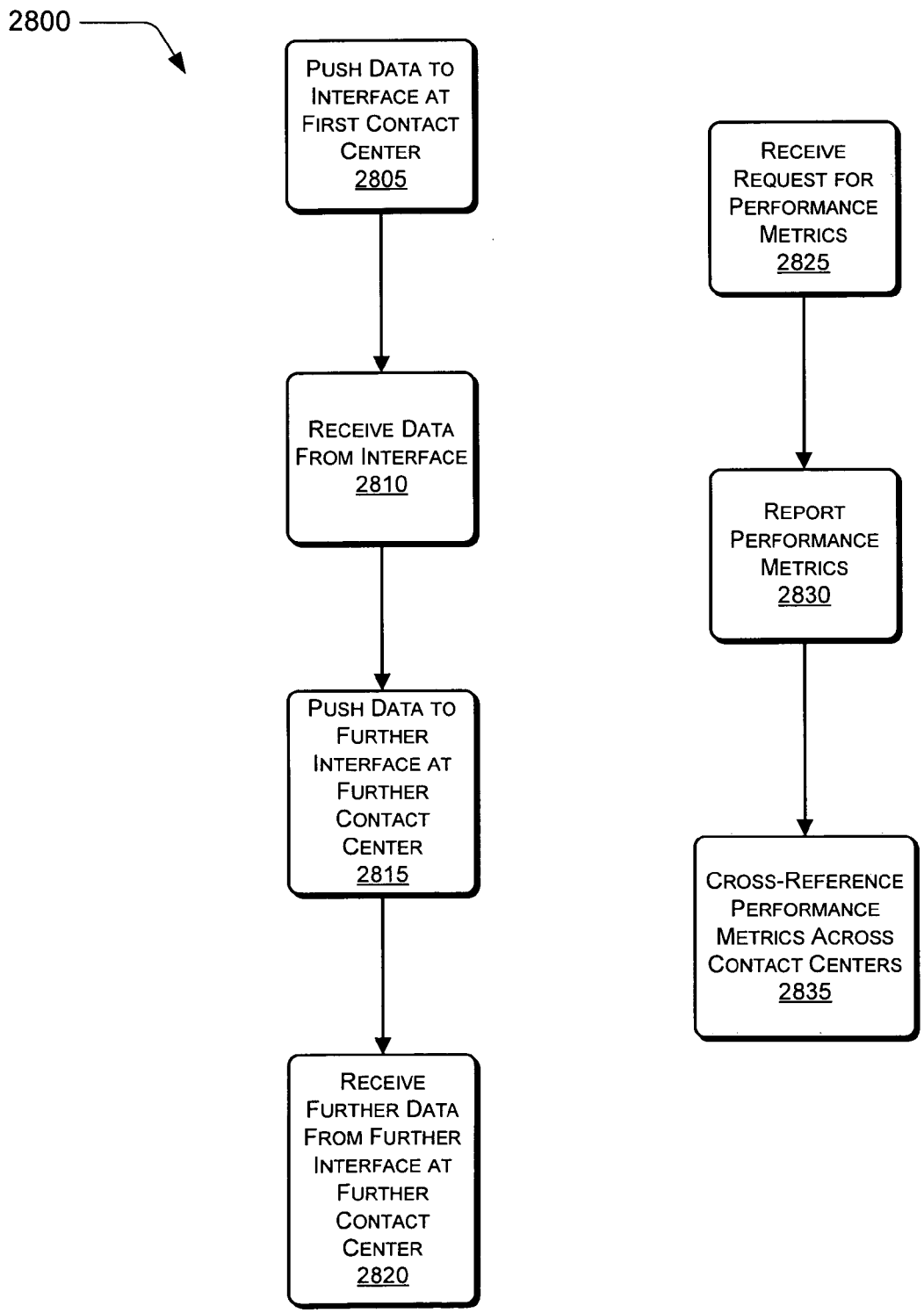
FIG. 28 is a flow diagram illustrating a process that can be performed by or on the workflow management component to facilitate an integrated transaction workflow between contact centers.

FIG. 28 illustrates a process flow 2800 that can be performed by or on the workflow management component 135 to facilitate an integrated transaction workflow between a plurality of contact centers 110. While the process flow 2800 is described herein as being performed in connection with certain architectures, apparatus, and components, it is understood that the process flow 2800 could also be performed on other architectures, apparatus, and components without departing from the scope and spirit of the subject matter described and claimed herein.

In block 2805, data, for example data 150, is pushed to the agent interface 140(1), which is accessible to the agent 130(1) at the contact center 110(1). This data 150 can serve to guide the interaction 115 between the customer 105 and the agent 130(1). This data 150 can take the form of a script, or the form of a form presented via the agent interface 140(1). The server 160 can drive or push this data 150 to the agent interface 140(1).

In block 2810, data is received from the agent interface 140(1) that is related to the integrated transactional workflow involving the contact center 110(1) and at least a further contact center 110(N). This data is received in response to the data 150 driven in block 2805, and for convenience, can be considered part of the data flow 150 shown in FIG. 1. For example, the data 150 received in block 2810 might take the form of data pulled from the agent interface 140(1) as entered by the agent 130(1) or screen-scraped automatically. In any event, this data 150 can be stored in the data store 155. This data 150 can involve the customer 105 and/or the subject matter of the interaction 115.

In block 2815, at least a portion of the data received in block 2810 is pushed to at least the further agent interface 140(N), which is accessible to at least a further agent 130(N) at the further contact center 110(N). The data push represented in block 2815 enables the further agent 130(N) to resume the workflow started by the agent 130(1) in, for example, the first interaction 115. Therefore, the further agent 130(N) can more efficiently perform the second interaction 170.

In block 2820, at least further data is received from the further agent interface 140(N). This data received in block 2820 may result from the second interaction 170, which is further related to the integrated transactional workflow. For convenience, the data flows involved in blocks 2815 and 2820 can be represented by the data flow 175 shown in FIG. 1. In any event, this data 175 can be stored in the data store 155. This data 175 can involve the customer 105 and/or the subject matter of the interaction 115. As with the data 150, the data 175 can be entered manually by the agent 130 or screen-scraped automatically.

Also shown in FIG. 28 are additional process blocks 2825, 2830, and 2835 that involve performance metrics that are derived, at least in part, upon the data flows 150 and 175. More particularly, the workflow management component 135 may derive the performance metrics from a plurality of interactions 115 and 170 with a plurality of different customers 105, as performed by a plurality of agents 130 at a plurality of contact centers 110.

For example, in block 2825, the workflow management component 135 can receive a request for performance metrics relating to one of the contact centers 110. It may be appropriate to allow a given contact center 110 to request performance metrics about only itself. In block 2830, the workflow management component 135 can provide a report of performance metrics relating to the requesting contact center 110.

In block 2835, the workflow management component 135 can cross-reference performance metrics related to different contact centers 110, as discussed above, to generate one or more further reports that may isolate trends or other conclusions that may not be readily apparent from considering the performance metrics of only one contact center 110. For example, cross-referencing these performance metrics across multiple contact centers 110 that handle integrated workflows may reveal particular combinations of agents 130 and/or contact centers 110 who appear to work well together. Having identified these combinations, the workflow management component 135 can thereafter enable transfers of future customers 105 between the particular combinations of agents 130 and/or contact centers 110 as revealed by analyzing the performance metrics. This analysis can facilitate a level of feedback to enhance the efficiency of one or more of the agents 130 and/or contact centers 110.

Figure 29:
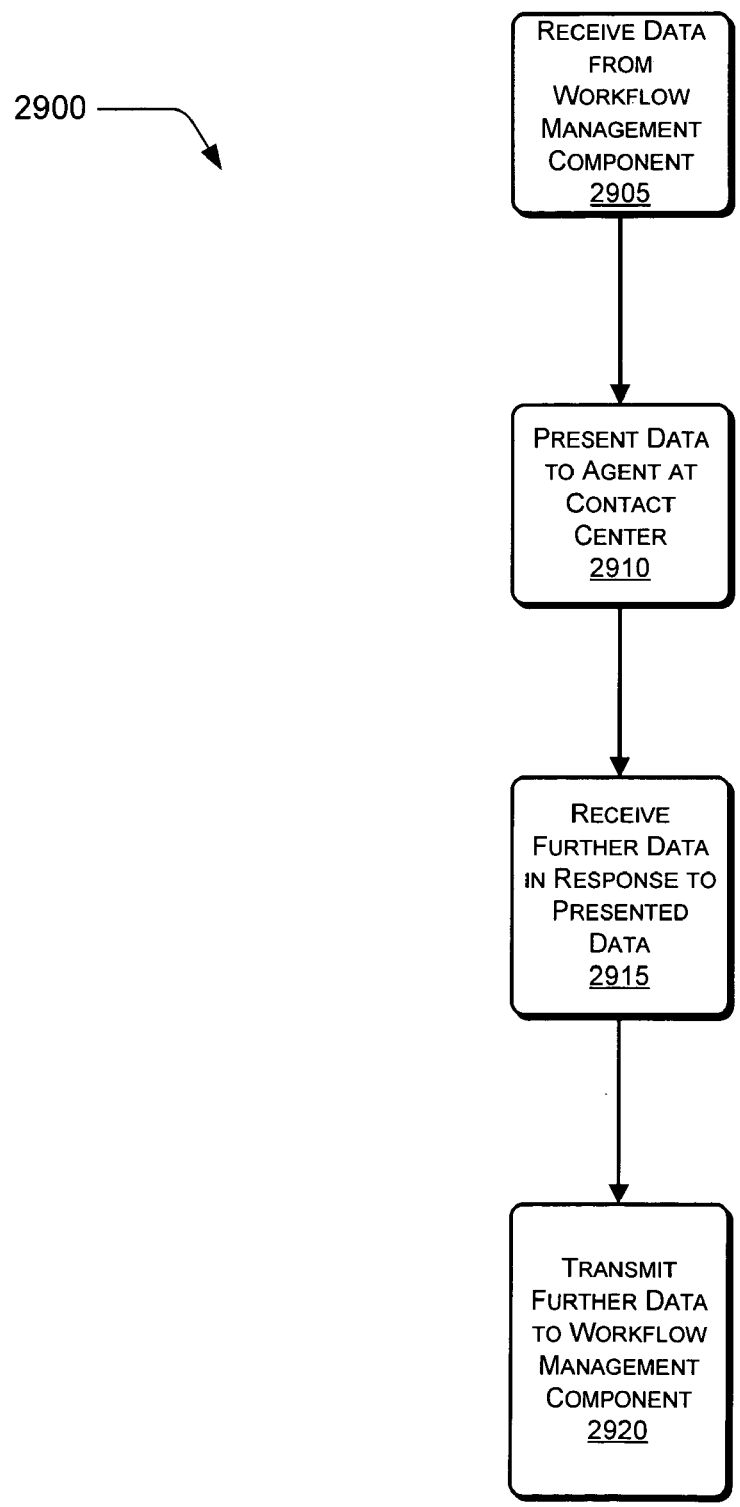
FIG. 29 is a flow diagram illustrating a process flow that may be performed by or in connection with the web browsers at the contact centers to facilitate an integrated transaction workflow between contact centers.

FIG. 29 illustrates a process flow 2900 that may be performed by or in connection with the agent interfaces 140 at the contact centers 110. While the process flow 2900 is described herein as being performed in connection with certain architectures, apparatus, and components, it is understood that the process flow 2900 could also be performed on other architectures, apparatus, and components without departing from the scope and spirit of the subject matter described and claimed herein.

In block 2905, data is received from, for example, the workflow management component 135 by the agent interfaces 140 at the contact centers 110. For convenience, the data received in block 2905 may be considered, at least in part, to be the data flow 150 shown in FIG. 1. As discussed elsewhere herein, this data 150 may serve to guide, for example, interaction 115 or interaction 170. This data 150 may take the form of a script or a form that is, for example, pushed to the agent interfaces 140 for completion by the agents 130. Alternatively, the form may be populated automatically, at least in part, using, for example, screen-scraping techniques.

It is understood that the processing represented in block 2905 can be executed in connection with either of the contact centers 110. Assuming that block 2905 is being executed in connection with the contact center 110(1) and the interaction 115, the data received in block 2905 would drive or guide the interaction 115 as part of an integrated workflow that can also include at least the subsequent interaction 170.

Assuming, however, that block 2905 is being executed in connection with the contact center 110(N) and the interaction 170, the data received in block 2905 would drive or guide the interaction 170 as part of an integrated workflow that can also include at least the previous interaction 115.

In block 2910, the data received in block 2905 is presented on one of the agent interfaces 140 for access by the agents 130 at the contact centers 110. It is understood that the processing represented in block 2910 can be executed in connection with either of the contact centers 110. Assuming that block 2910 is being executed in connection with the contact center 110(1) and the interaction 115, the data presented in block 2910 would also drive or guide the interaction 115 as part of an integrated workflow that can also include at least the subsequent interaction 170.

Assuming, however, that block 2910 is being executed in connection with the contact center 110(N) and the interaction 170, the data presented in block 2910 would drive or guide the interaction 170 as part of an integrated workflow that can also include at least the previous interaction 115.

In block 2915, further data is received that relates to an interaction 115 or 170 between the agents 130 and a customer 105 as part of an integrated transactional workflow involving two or more contact centers 110. The further data received in block 2915 is received in response to the data presented in block 2910.

It is understood that the processing represented in block 2915 can be executed in connection with either of the contact centers 110. Assuming that block 2915 is being executed in connection with the contact center 110(1) and the interaction 115, the further data received in block 2915 would result from the interaction 115. Recall that the interaction 115 may be part of an integrated workflow that can also include at least the subsequent interaction 170.

Assuming, however, that block 2915 is being executed in connection with the contact center 110(N) and the interaction 170, the further data received in block 2915 would result from the interaction 170. Recall that the interaction 170 may be part of an integrated workflow that can also include at least the previous interaction 115.

In block 2920, at least a portion of the further data is transmitted to the workflow management component 135. It is understood that the processing represented in block 2920 can be executed in connection with either of the contact centers 110. Assuming that block 2920 is being executed in connection with the contact center 110(1) and the interaction 115, the further data transmitted in block 2920 would result from the interaction 115. Recall that the interaction 115 may be part of an integrated workflow that can also include at least the subsequent interaction 170.

Assuming, however, that block 2920 is being executed in connection with the contact center 110(N) and the interaction 170, the further data transmitted in block 2920 would result from the interaction 170. Recall that the interaction 170 may be part of an integrated workflow that can also include at least the previous interaction 115.

Figure 30:
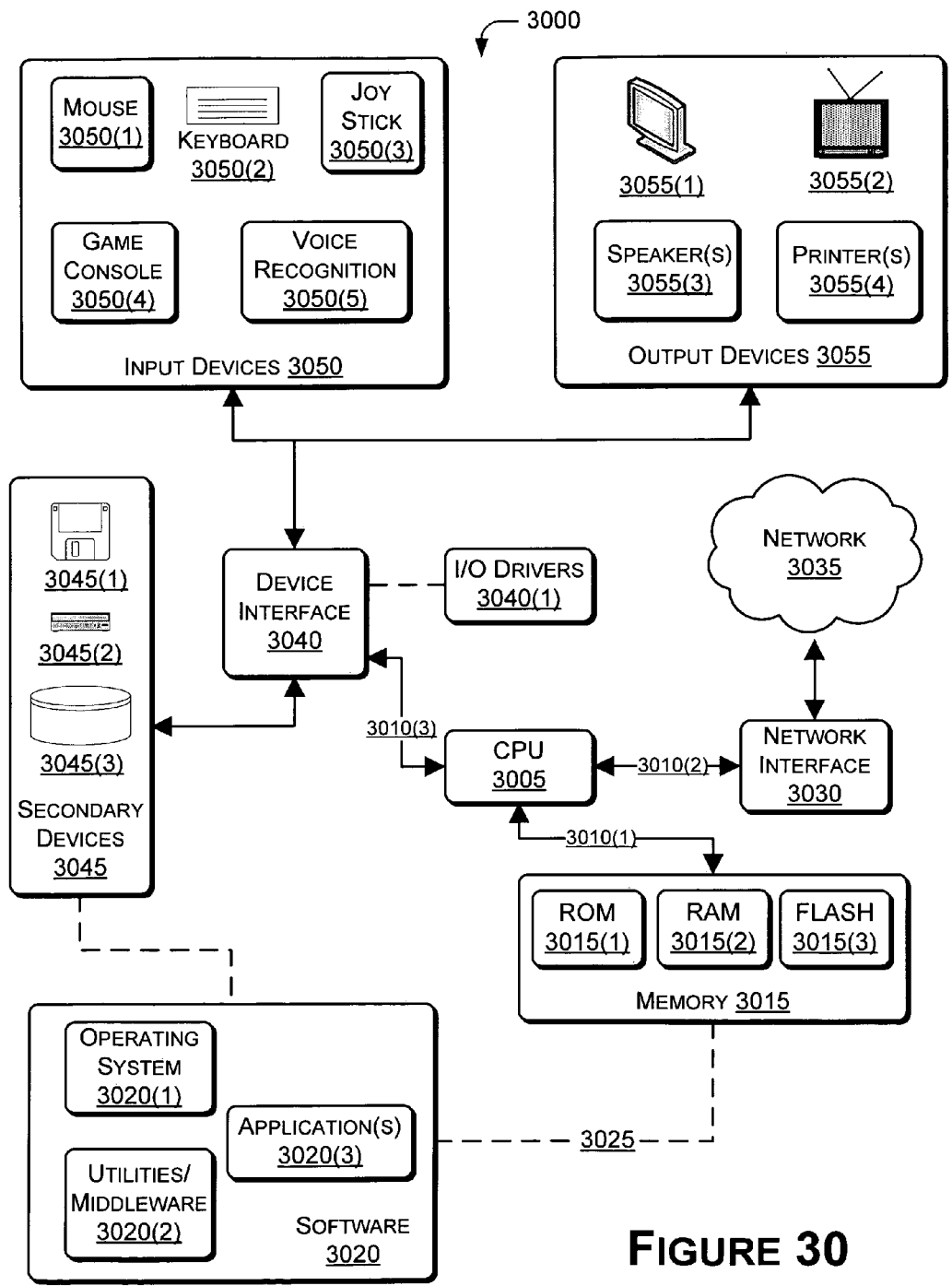
FIG. 30 is a block diagram illustrating a computing environment suitable for implementing the architectures described herein for integrating transactional workflows distributed across two or more contact centers.

FIG. 30 illustrates an overall computing environment 3000 for implementing integrated transactional workflows distributed across multiple contact centers. More particularly, the computing environment 3000 may be used in whole or in part to construct, for example, the workflow management component 135 or any components thereof, such as the report generation component 2710. The computing environment 3000 may also be used to construct web servers that drive data to, or receive data from, the agent interfaces 140. One or more instances of the computing environment 3000, or components thereof, may be used to implement, for example, the workflow management component 135, agent interfaces 140, or the like.

Any of the foregoing may be implemented as a computer-based device or a computing environment 3000 that includes a central processing unit (CPU) 3005. The CPU 3005 communicates with a variety of components via busses 3010. It is understood that the layout of the busses 3010 is shown in FIG. 30 for convenience and clarity of illustration, and implementations of the teachings herein may integrate the respective busses 3010 into a common bus 3010.

The CPU 3005 communicates with a memory module 3015 via a bus 3010(1). The bus 3010(1) may be of any data width or any bandwidth as chosen by those skilled in the art for a given implementation. The memory module 3015 can include at least read-only memory (ROM) portion 3015(1), random-access memory (RAM) portion 3015(2), and flash portion 3015(3). Portions of the memory module 3015 can store software components 3020 during execution, as represented by the line 3025. The software components 3020 can include at least operating system components 3020(1), utility or middleware components 3020(2), and application components 3020(3).

The CPU 3005 can communicate with a network interface controller (NIC) 3030 via a bus 3010(2). The NIC 3030 enables the CPU 3005 to communicate with external devices via a network 3035, which may be a LAN, WAN, or any other type of communications network.

The CPU 3005 can communicate with peripheral devices via one or more device interfaces 3040. The device interface 3040 includes any device appropriate to interface the peripheral devices to communicate with the CPU 3005 via the bus 3010(3). Some peripheral devices may be associated with appropriate device driver software, which is represented generally by the block 3040(1).

FIG. 30 illustrates peripheral devices in the form of secondary storage devices 3045, input devices 3050, and output devices 3055. The secondary storage devices 3045 can include a drive 3045(1), for removable media, which can include magnetic media, optical media, or any other type of removable or portable media. The secondary storage devices 3045 can include a drive 3045(2) for fixed media, which can include hard disk drives or the like. The secondary storage devices 3045 can also include mass data storage unit 3045(3), which may house components such as the data store 155. The peripheral devices can also include servers, such as database servers, application servers, web servers, directory servers, management servers, or the like.

The input devices 3050 enable users to issue commands to the CPU 3005, and can include mouse 3050(1), keyboard 3050(2), joy stick 3050(3), game console 3050(4), or voice recognition unit 3050(5). The output devices 3055 enable the CPU 3005 provide some level or type of response to the user, and can include monitor 3055(1), a television set 3055(2) interfaced to communicate with the CPU 3005, one or more audio speakers 3055(3), and one or more printers 3055(4), which can be of any configuration.

It is understood that computer-readable media suitable for storing software executing the processes taught herein can include at least the memory module 3015, the secondary storage devices 3045. It is further understood that signals propagating the software to the computer-readable media for execution of the processes taught herein may be transmitted via the busses 3010, the NIC 3030, and/or the network 3035.

Figure 31:
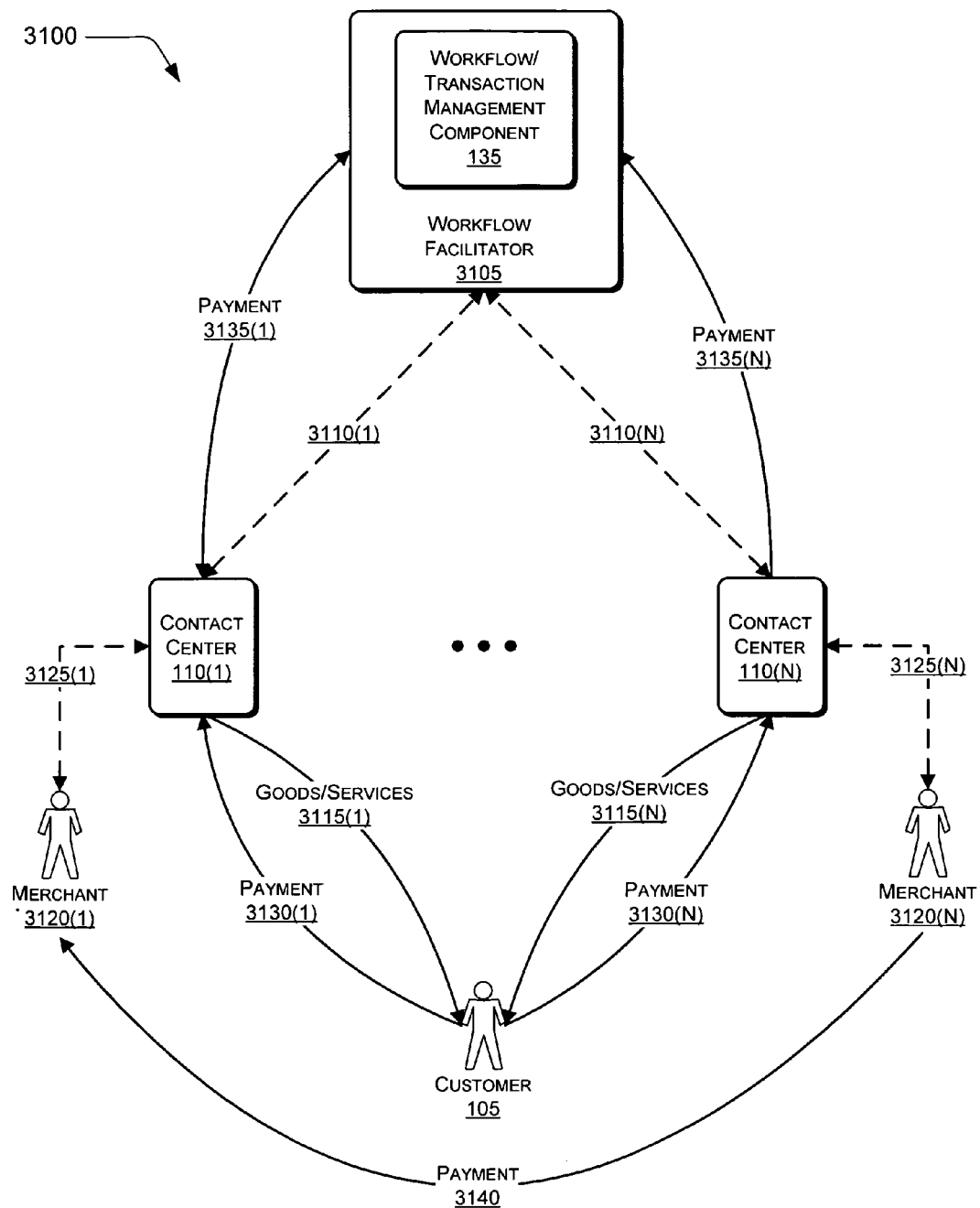
FIG. 31 is a block diagram illustrating an arrangement suitable for implementing business methods in the context of the integrated transactional workflows described herein.

FIG. 31 illustrates an arrangement 3100 suitable for implementing business methods in the context of the teachings herein. In FIG. 31, a workflow facilitator 3105 is shown in connection with two or more contact centers 110. The workflow facilitator 3105 can be associated with one or more implementations of the workflow/transaction management component 135. For convenience but not limitation, an illustrative relationship between the workflow facilitator 3105 and the workflow/transaction management component 135 is shown in FIG. 31. The contact centers 110 are described above in connection with, for example, FIG. 1, and that description applies equally to the arrangement 3100 shown in FIG. 31. It is noted that while two contact centers 110 are shown in FIG. 31, the arrangement 3100 could include any number of contact centers 110, with the variable N shown in FIG. 31 taking any value greater than one.

As shown in FIG. 31, a line 3110(1) generally represents a relationship between the workflow facilitator 3105 and the contact center 110(1). Similarly, a line 3110(2) generally represents a relationship between the workflow facilitator 3105 and the contact center 110(2). These relationships can include, for example, a contractual relationship, agreement, or other understanding entered-into or otherwise effective between the workflow facilitator 3105 and the contact centers 110.

Pursuant to the relationships represented by the lines 3110, the workflow facilitator 3105 may enable a customer 105 to interact with both of the contact centers 110(1) and 110(N), as described above. During a first interaction with the contact center 110(1), the customer 105 may obtain first goods and/or services (hereinafter, "goods/services"), represented generally by the reference sign 3115(1).

The goods/services 3115(1) may be offered by or on behalf of a merchant 3120(1). The relationship between the merchant 3120(1) and the contact center 110(1) is symbolized by the line 3125(1). This relationship 3125(1) can take different forms. In a first example, the merchant 3120(1) may be outsourcing customer management relationship functions to the contact center 110(1). In a further example, the merchant 3120(1) may be operating the contact center 110(1) as an in-house function. Other scenarios may be possible.

In exchange for the goods/services 3115(1), the customer 105 may provide a first payment to merchant 3120(1) through the contact center 110(1), represented generally by the reference sign 3130(1). In the example discussed above, the first interaction may involve a reservation for lodging sought by or offered to the customer 105. In such an example, the merchant 3120(1) might be a hotel chain, resort, or the like.

During at least a second interaction with the contact center 110(N), the customer 105 may obtain additional goods and/or services (hereinafter, "goods/services"), represented generally by the reference sign 3115(N).

The additional goods/services 3115(N) may be offered by or on behalf of a merchant 3120(N). The relationship between the merchant 3120(N) and the contact center 110(N) is symbolized by the line 3125(N). This relationship 3125(N) can take different forms, similar to those possible for the relationship 3125(1) between the merchant 3120(1) and the contact center 110(1) as discussed above. However, it is noted that the relationship 3125(1) may or may not take the same form as the relationship 3125(N).

In exchange for the goods/services 3115(N), the customer 105 may provide a second payment to the contact center 110(N), represented generally by the reference sign 3130(N). In the example discussed above, the second interaction may involve an offer of travel insurance offered to the customer 105. In such an example, the merchant 3120(1) might be an insurance company, broker, or the like, and the agent 130 working in connection with the contact center 110(N) may be licensed or certified as appropriate to offer the goods/services 3115(N) (e.g., the travel insurance).

Having set forth the above transaction flows, various compensation schemes between the workflow facilitator 3105 and the contact centers 110 are now described. Only for the convenience of this description, the contact centers 110 are discussed collectively with the corresponding merchants 3120, rather than separately therefrom. It is understood, however, that in some implementations, compensation may flow through the contact centers 110 and ultimately involve the merchants 3120.

In any event, the workflow facilitator 3105 may be compensated, at least in part, based on the revenue realized by the merchants 3120 and/or contact centers 110 as a result of the transactions facilitated by the workflow/transaction management component 135. For example, the workflow facilitator 3105 may receive a first compensation component 3135(1) that is based on revenue realized by the contact center 110(1) in connection with the first interaction with the customer 105. This compensation component 3135(1) may be specified as a percentage or amount of the payment 3130(1) rendered by the customer 105. For example, if the goods/services 3115 takes the form of an enrollment fee of, e.g., $36.00 per year, the workflow facilitator 3105 may be paid $6.00, or some other amount or percentage, of this fee.

Alternatively, the compensation component 3135(1) may be specified as a flat fee on a per-transaction basis, regardless of how much revenue is realized as a result of the transaction. For example, the workflow facilitator 3105 may be paid, e.g., $6.00 per transaction or interaction conducted with a customer 105, regardless of how much revenue ultimately results from the transaction or interaction. Other scenarios may be implemented, as well.

Similarly, the workflow facilitator 3105 may receive at least a further compensation component 3135(N) that is based on revenue realized by the contact center 110(N) in connection with the further interaction with the customer 105. Like the compensation component 3135(1) discussed above, the compensation component 3135(N) may be specified as a percentage of the payment 3130(N) rendered by the customer 105, or may be specified as a flat fee on a per-transaction basis. Other scenarios may be implemented, as well.

It is noted that the form of the compensation component 3135(1) may or may not be the same as the form of the compensation component 3135(N) in implementations of the teachings herein. For example, one or more of the compensation components 3135 may be specified as a percentage or amount of revenue realized, while one or more other of the compensation components 3135 may be specified on a per-transaction basis without regard to realized revenue. It is further noted, accordingly, that the respective amounts of the compensation component 3135(1) and the compensation component 3135(N) may or may not be equal to one another. For example, subsequent merchants 3120(N) and/or related contact centers 110(N) may be willing to pay higher compensation to the workflow facilitator 3105, because without the capabilities of the workflow facilitator 3105, these subsequent merchants 3120(N) and/or related contact centers 110(N) may not have the opportunity to interact with the customer 105 at all.

In some implementations of the arrangement 3100, the contact center 110(N) and/or merchant 3120(N) (referred to collectively for convenience as "merchant 3120(N)") may compensate the contact center 110(1) and/or merchant 3120(1) (referred to collectively for convenience as "merchant 3120(1)"). This payment is represented generally by the line 3140. The payment 3140 may be computed, for example, on a per-transfer basis, but may also be computed based on successful transactions conducted by the merchant 3120(N) with customers 105. Other computation scenarios for the payment 3140 may also be implemented.

It is noted that the payment 3140 may pass directly from the merchant 3120(N) to the merchant 3120(1), as shown in FIG. 31 for clarity and convenience. However, the payment 3140 may also pass through the workflow facilitator 3105 as an intermediary. Thus, the payment 3140 may, to some extent, overlap with the payment 3135(N). The workflow facilitator 3105 may pass the entire payment 3140 received from the merchant 3120(N) through to the merchant 3120(1). Alternatively, the workflow facilitator 3105 may retain some portion of the payment 3140 received from the merchant 3120(N) as compensation. To illustrate the foregoing scenarios, the arrow representing the payment 3135(1) is made bi-directional, to indicate that in some implementations, compensation may flow from the workflow facilitator 3105 to the merchant 3120(1).

In light of the foregoing, it is further noted that in some implementations, the payment 3135(1) from the merchant 3120(1) to the workflow facilitator 3105 may be optional. Put differently, the workflow facilitator 3105 may compensate the merchant 3120(1), instead of the merchant 3120(1) compensating the workflow facilitator 3105. For example, the workflow facilitator 3105 may fund a payment to the merchant 3120(1) partially or entirely using a payment 3135(N) from the merchant 3120(N), as discussed above. The merchant 3120(N) may be motivated to participate in these scenarios because, for example, the merchant 3120(N) may not otherwise have the opportunity to interact with customers 105, or because it may otherwise cost the merchant 3120(N) much more to seek out and interact with the customers 105.

Although embodiments for supporting integrated transactional workflows distributed across multiple contact centers 110 have been described in language specific to structural features and/or methods, it is to be understood that the subject of the appended claims is not necessarily limited to the specific features or methods described. Rather, the specific features and methods are disclosed as exemplary implementations of integrated transactional workflows distributed across multiple contact centers 110.

What is claimed is:

1. A system, comprising:
a processor, including:
an agent interface, executable at a contact center concurrently with an application, to:
enable an agent to conduct a live interaction with a customer as part of a first transaction, and
receive data relating to the interaction during the course of the live interaction;
at least one further agent interface, executable at least one further contact center corresponding to an entity separate from an entity corresponding to the agent interface, to:
enable at least one further agent to conduct at least a further live interaction with an intent to complete a separate intended outcome that is independent of a completion of an outcome associated with the first transaction with the customer as part of a second transaction that is unrelated to the first transaction,
provide the data to the further agent during the course of the further live interaction, and
receive further data relating to the further live interaction; and
a workflow management component coupled to the non-integrated infrastructures of the agent interface and the at least one further agent interface to:
receive authorization from the user to be placed in contact with the at least one further agent interface as part of the second transaction that is unrelated to the first transaction;
receive the data from the agent interface,
transfer the live interaction between the agent and the customer to the further live interaction between the at least one further agent and the customer, upon concluding the live interaction between the agent and the customer, as part of the second transaction that is unrelated to the first transaction,
provide the data to the at least one further agent via the at least one further agent interface, and
receive the further data from the at least one further agent interface as part of an integrated workflow performed in connection with the agent and the at least one further agent.

2. The system of claim 1, wherein the agent interface is not integrated with the application.

3. The system of claim 1, wherein the agent interface is to further receive data entered manually by the agent.

4. The system of claim 1, wherein the agent interface is to further receive data that is populated automatically.

5. The system of claim 1, wherein the workflow management component is associated with a third party relative to the contact center and the at least one further contact center.

6. The system of claim 1, wherein the at least one further agent interface is to further receive further data from the at least one further agent, and wherein the workflow management component is coupled to receive the further data from the at least one further agent interface.

7. The system of claim 1, wherein the workflow management component includes a data store adapted at least to receive the data from the agent and to provide the data to the further agent.

8. The system of claim 1, wherein the workflow management component is responsive to at least one request from a manager associated with the contact center for a report pertaining to performance metrics related to the contact center.

9. The system of claim 1, wherein the workflow management component is responsive to at least one request from a manager associated with the at least one further contact center for a report pertaining to performance metrics related to the at least one further contact center.

10. The system of claim 1, wherein the workflow management component includes a report generation component that is to retrieve data from the data store relating to interactions involving at least the agent and the at least one further agent, and wherein the report generation component is to cross-reference data relating to interactions involving the agent against further data relating to further interactions involving the at least one further agent.

11. A workflow management component, comprising:
a processor, including:
a data store; and
a server to:
push content to an agent interface related to a first network infrastructure accessible by an agent at a contact center,
receive data from the agent interface and store the same in the data store when authorized by a user as part of a first live transaction with the user,
transfer the first live transaction with the user to at least one further agent interface related to a second network infrastructure at the end of the first live interaction between the agent and the user,
push at least the data to at least the one further agent interface accessible by at least one further agent at least one further contact center corresponding to an entity separate from an entity corresponding to the agent interface as part of a user-authorized discrete, second live transaction with the user of which an intended outcome is independent of completion of an outcome associated with the first live transaction, and
receive further data from the at least one further agent interface and to store the same in the data store.

12. The workflow management component of claim 11, wherein the server is adapted to receive at least one request for a report of performance metrics relating to the contact center.

13. The workflow management component of claim 11, wherein the server is adapted to provide reports of performance metrics to at least one of the contact center and the at least one further contact center.

14. The workflow management component of claim 11, further comprising a report generation component to:
retrieve data from the data store relating to past interactions involving at least the agent and the at least one further agent, and
cross-reference data relating to past interactions involving the agent against further data relating to further interactions involving the further agent.

15. One or more computer readable media comprising computer executable instructions that, when executed, direct a computing device to:
- push data to an agent interface that is accessible by an agent at a contact center during a customer-authorized real-time transaction with the customer;
- receive, from the agent interface, data that is related to an integrated transactional workflow involving the contact center and at least one further contact center as authorized by the customer;
- push at least a portion of the data to at least one further agent interface in a non-integrated infrastructure that is accessible to at least one further agent at the further contact center corresponding to an entity separate from an entity corresponding to the agent interface for a subsequent discrete real-time transaction, of which an intended outcome is independent of completion of an outcome associated with an outcome of the real-time transaction with the agent at the contact center, after concluding the real-time transaction between the agent and the customer; and
- receive at least further data from a browser that is further related to the integrated transactional workflow.

16. The computer readable media of claim 15, wherein the instructions directing the computing device to push data include instructions directing the computing device to push data that guides the agent in interacting with at least the customer as at least part of the integrated transactional workflow.

17. The computer readable media of claim 15, wherein the instructions directing the computing device to receive data include instructions directing the computing device to receive data pertaining to at least one customer involved in the integrated transactional workflow.

18. The computer readable media of claim 15, wherein the instructions directing the computing device to receive data include instructions directing the computing device to receive data pertaining to at least one interaction related to the integrated transactional workflow.

19. The computer readable media of claim 15, wherein the instructions directing the computing device to push at least a portion of the data include instructions directing the computing device to push data pertaining to at least the customer involved in the integrated transactional workflow.

20. The computer readable media of claim 15, wherein the instructions directing the computing device to push at least a portion of the data include instructions directing the computing device to push data pertaining to at least one interaction related to the integrated transactional workflow.

21. The computer readable media of claim 15, wherein the instructions directing the computing device to receive at least further data include instructions directing the computing device to receive further data pertaining to at least the subsequent discrete real-time interaction involving at least the customer and related to the integrated transactional workflow.

22. The computer readable media of claim 15, wherein the instructions directing the computing device to receive at least further data include instructions directing the computing device to receive further data pertaining to at least the subsequent discrete real-time interaction related to the integrated transactional workflow.

23. The computer readable media of claim 15, wherein the instructions directing the computing device to receive data from the agent interface include instructions directing the computing device to receive data that is manually entered by the agent.

24. The computer readable media of claim 15, wherein the instructions directing the computing device to receive data from the agent interface include instructions directing the computing device to receive data that is automatically populated.

25. The computer readable media of claim 15, wherein the instructions directing the computing device to receive at least further data include instructions directing the computing device to receive data that is manually entered by the agent.

26. The computer readable media of claim 15, wherein the instructions directing the computing device to receive at least further data include instructions directing the computing device to receive data that is automatically populated.

27. The computer readable media of claim 15, further comprising instructions directing the computing device to receive at least one request for performance metrics relating to at least one of the contact center and the further contact center.

28. The computer readable media of claim 15, further comprising instructions directing the computing device to provide at least one report of performance metrics relating to at least one of the contact center and the further contact center.

29. The computer readable media of claim 15, further comprising instructions directing the computing device to cross-reference performance metrics related to the contact center with further performance metrics related to the further contact center.

30. One or more computer readable media comprising computer executable instructions that, when executed, direct a computing device to:
- receive data from a workflow management component;
- present the data on an agent interface that is accessible to an agent at a contact center during a customer-authorized real-time transactional interaction with the customer;
- in response to the presented data, receive further data relating to at least one concluded real-time transactional interaction between the agent and the customer as part of an integrated transactional workflow involving the contact center related to a first network infrastructure and at least a further contact center, corresponding to an entity separate from an entity corresponding to the agent interface, related to a second network infrastructure; and
- transmit at least a portion of the further data to the workflow management component for use in an unrelated customer-authorized real-time transaction interaction with the customer for which an intended outcome is independent of completion of an outcome associated with the real-time transactional interaction with the agent interface.

31. The computer readable media of claim 30, wherein the instructions directing the computing device to receive data include instructions directing the computing
- device to receive data from a workflow management component that is not integrated with the contact center.

32. The computer readable media of claim 30, wherein the instructions directing the computing device to receive data include instructions directing the computing device to receive data that guides the agent in interacting with the customer.

33. The computer readable media of claim 30, wherein the instructions directing the computing device to present the data include instructions directing the computing device to present on the agent interface a form that includes at least one field to be manually completed by the agent.

34. The computer readable media of claim 30, wherein the instructions directing the computing device to present the data include instructions directing the computing device to present on the agent interface a form that includes at least one field to be automatically populated.

35. The computer readable media of claim 30, wherein the instructions directing the computing device to receive data include instructions directing the computing device to receive data via a form that is manually completed by the agent.

36. The computer readable media of claim 30, wherein the instructions directing the computing device to receive data include instructions directing the computing device to receive data via a form that is, at least in part, automatically populated.

37. The computer readable media of claim 30, wherein the instructions directing the computing device to receive data include instructions directing the computing device to receive data that guides the agent in performing a first interaction performed with a customer as part of the integrated workflow.

38. The computer readable media of claim 30, wherein the instructions directing the computing device to receive data include instructions directing the computing device to receive data that guides the agent in performing the unrelated customer-authorized real-time transactional interaction performed with the customer as part of the integrated workflow.

39. The computer readable media of claim 30, wherein the instructions directing the computing device to receive content include instructions directing the computing device to receive content, at least in part, from a further contact center in connection with a further interaction occurring previously to the interaction.

* * * * *